(12) United States Patent
Engberg

(10) Patent No.: US 8,707,030 B2
(45) Date of Patent: Apr. 22, 2014

(54) DISTRIBUTED DELEGATED PATH DISCOVERY AND VALIDATION

(75) Inventor: David Engberg, Washington, DC (US)

(73) Assignee: CoreStreet, Ltd., Cambridge, MA (US)

( * ) Notice: Subject to any disclaimer, the term of this patent is extended or adjusted under 35 U.S.C. 154(b) by 1029 days.

(21) Appl. No.: 10/993,131

(22) Filed: Nov. 19, 2004

(65) Prior Publication Data

US 2005/0154918 A1     Jul. 14, 2005

Related U.S. Application Data

(60) Provisional application No. 60/523,398, filed on Nov. 19, 2003.

(51) Int. Cl.
   *H04L 29/06*    (2006.01)

(52) U.S. Cl.
   USPC .......................................................... 713/157

(58) Field of Classification Search
   USPC .......................................................... 713/157
   See application file for complete search history.

(56) References Cited

U.S. PATENT DOCUMENTS

| | | | |
|---|---|---|---|
| 4,200,770 A | 4/1980 | Hellman et al. | |
| 4,218,582 A | 8/1980 | Hellman et al. | |
| 4,309,569 A | 1/1982 | Merkle | |
| 4,326,098 A | 4/1982 | Bouricius et al. | |
| 4,825,052 A | 4/1989 | Chemin et al. | |
| 4,879,747 A | 11/1989 | Leighton et al. | |
| 4,881,264 A | 11/1989 | Merkle | |
| 4,888,801 A | 12/1989 | Foster et al. | |
| 4,926,480 A | 5/1990 | Chaum | |
| 4,943,707 A | 7/1990 | Boggan | |
| 4,944,009 A | 7/1990 | Micali et al. | |
| 4,995,081 A | 2/1991 | Leighton et al. | |

(Continued)

FOREIGN PATENT DOCUMENTS

| | | |
|---|---|---|
| EP | 0 618 550 A1 | 3/1994 |
| EP | 0 723 251 A2 | 1/1996 |

(Continued)

OTHER PUBLICATIONS

\*\*Facsimile message from Chini Krishnan of Integris Security, Inc. to Professor Silvio Micali, dated Feb. 17, 1997, 7 pages including cover sheet, submitted in attached sealed envelope as Proprietary Material Not Open to Public. To Be Opened Only by Examiner or Other Authorized U.S. Patent and Trademark Office Employee.

(Continued)

*Primary Examiner* — Philip Chea
*Assistant Examiner* — Daniel Hoang
(74) *Attorney, Agent, or Firm* — Muirhead and Saturnelli, LLC

(57) ABSTRACT

Providing path validation information for a system includes determining paths between a subset of certificate of the system and at least one trust root, storing each of the paths in a table prior to a request for path validation information, and fetching the validation information stored in the table in response to a request for path validation information. Providing path validation information may also include digitally signing the validation information. Providing path validation information may also include applying constraints to the validation information and only providing validation information that is consistent with the constraints. Determining paths may include constructing a directed graph of trusted roots and the subset of certificates and performing a depth-first acyclic search of the graph.

24 Claims, 6 Drawing Sheets

(56) References Cited

U.S. PATENT DOCUMENTS

| | | |
|---|---|---|
| 5,003,597 A | 3/1991 | Merkle |
| 5,005,200 A | 4/1991 | Fischer |
| 5,016,274 A | 5/1991 | Micali et al. |
| 5,097,504 A | 3/1992 | Camion et al. |
| 5,136,646 A | 8/1992 | Haber et al. |
| 5,136,647 A | 8/1992 | Haber et al. |
| 5,157,726 A | 10/1992 | Merkle et al. |
| 5,214,702 A | 5/1993 | Fischer |
| 5,231,666 A | 7/1993 | Matyas |
| 5,261,002 A | 11/1993 | Perlman et al. |
| 5,276,737 A | 1/1994 | Micali |
| 5,299,263 A | 3/1994 | Beller et al. |
| 5,307,411 A | 4/1994 | Anvret et al. |
| 5,315,657 A | 5/1994 | Abadi et al. |
| 5,315,658 A | 5/1994 | Micali |
| 5,340,969 A | 8/1994 | Cox |
| 5,351,302 A | 9/1994 | Leighton et al. |
| 5,371,794 A | 12/1994 | Diffie et al. |
| 5,396,624 A | 3/1995 | Campbell, Jr. |
| RE34,954 E | 5/1995 | Haber et al. |
| 5,420,927 A | 5/1995 | Micali |
| 5,432,852 A | 7/1995 | Leighton et al. |
| 5,434,919 A | 7/1995 | Chaum |
| 5,450,493 A | 9/1995 | Maher |
| 5,497,422 A | 3/1996 | Tysen et al. |
| 5,499,296 A | 3/1996 | Micali |
| 5,519,778 A | 5/1996 | Leighton et al. |
| 5,537,475 A | 7/1996 | Micali |
| 5,544,322 A | 8/1996 | Cheng et al. |
| 5,551,027 A | 8/1996 | Choy et al. |
| 5,553,145 A | 9/1996 | Micali |
| 5,604,804 A | 2/1997 | Micali |
| 5,606,617 A | 2/1997 | Brands et al. |
| 5,610,982 A | 3/1997 | Micali |
| 5,615,268 A | 3/1997 | Bisbee et al. |
| 5,615,269 A | 3/1997 | Micali |
| 5,629,982 A | 5/1997 | Micali |
| 5,638,447 A | 6/1997 | Micali |
| 5,659,616 A | 8/1997 | Sudia |
| 5,659,617 A | 8/1997 | Fischer |
| 5,666,414 A | 9/1997 | Micali |
| 5,666,415 A | 9/1997 | Kaufman |
| 5,666,416 A | 9/1997 | Micali |
| 5,666,420 A | 9/1997 | Micali |
| 5,677,955 A | 10/1997 | Doggett et al. |
| 5,687,235 A | 11/1997 | Perlman et al. |
| 5,699,431 A | 12/1997 | Van Oorschot et al. |
| 5,717,757 A | 2/1998 | Micali |
| 5,717,758 A | 2/1998 | Micali |
| 5,717,759 A | 2/1998 | Micali |
| 5,742,035 A | 4/1998 | Kohut |
| RE35,808 E | 5/1998 | Micali |
| 5,748,738 A | 5/1998 | Bisbee et al. |
| 5,768,379 A | 6/1998 | Girault et al. |
| 5,774,552 A | 6/1998 | Grimmer |
| 5,790,665 A | 8/1998 | Micali |
| 5,790,790 A | 8/1998 | Smith et al. |
| 5,793,868 A | 8/1998 | Micali |
| 5,799,086 A | 8/1998 | Sudia |
| 5,812,670 A | 9/1998 | Micali |
| 5,825,880 A | 10/1998 | Sudia et al. |
| 5,826,262 A | 10/1998 | Bui et al. |
| 5,841,865 A | 11/1998 | Sudia |
| 5,850,451 A | 12/1998 | Sudia |
| 5,857,022 A | 1/1999 | Sudia |
| 5,867,578 A | 2/1999 | Brickell et al. |
| 5,875,894 A | 3/1999 | Stromme |
| 5,903,651 A | 5/1999 | Kocher |
| 5,903,882 A | 5/1999 | Asay et al. |
| 5,960,083 A | 9/1999 | Micali |
| 5,982,898 A | 11/1999 | Hsu et al. |
| 5,995,625 A | 11/1999 | Sudia et al. |
| 6,009,177 A | 12/1999 | Sudia |
| 6,026,163 A | 2/2000 | Micali |
| 6,044,462 A | 3/2000 | Zubeldia et al. |
| 6,061,448 A | 5/2000 | Smith et al. |
| 6,097,811 A | 8/2000 | Micali |
| 6,119,137 A | 9/2000 | Smith et al. |
| RE36,918 E | 10/2000 | Micali |
| 6,134,326 A | 10/2000 | Micali et al. |
| 6,134,550 A * | 10/2000 | Van Oorschot et al. ......... 707/9 |
| 6,137,884 A | 10/2000 | Micali |
| 6,141,750 A | 10/2000 | Micali |
| 6,151,675 A | 11/2000 | Smith |
| 6,189,103 B1 | 2/2001 | Nevarez et al. |
| 6,192,407 B1 | 2/2001 | Smith et al. |
| 6,209,091 B1 | 3/2001 | Sudia et al. |
| 6,216,231 B1 | 4/2001 | Stubblebine |
| 6,292,893 B1 | 9/2001 | Micali |
| 6,301,659 B1 | 10/2001 | Micali |
| 6,385,655 B1 | 5/2002 | Smith et al. |
| 6,397,329 B1 | 5/2002 | Aiello et al. |
| 6,404,337 B1 | 6/2002 | Van Till et al. |
| 6,442,689 B1 | 8/2002 | Kocher |
| 6,470,086 B1 | 10/2002 | Smith |
| 6,487,599 B1 | 11/2002 | Smith et al. |
| 6,487,658 B1 | 11/2002 | Micali |
| 6,502,191 B1 | 12/2002 | Smith et al. |
| 6,516,411 B2 | 2/2003 | Smith |
| 6,529,956 B1 | 3/2003 | Smith et al. |
| 6,532,540 B1 | 3/2003 | Kocher |
| 6,609,196 B1 | 8/2003 | Dickinson, III et al. |
| 6,651,166 B1 | 11/2003 | Smith et al. |
| 6,658,568 B1 | 12/2003 | Ginter et al. |
| 6,671,805 B1 | 12/2003 | Brown et al. |
| 6,725,381 B1 | 4/2004 | Smith et al. |
| 6,748,529 B2 | 6/2004 | Smith et al. |
| 6,766,450 B2 | 7/2004 | Micali |
| 6,826,609 B1 | 11/2004 | Smith et al. |
| 6,981,142 B1 | 12/2005 | Gulcu |
| 2001/0011255 A1 | 8/2001 | Asay et al. |
| 2001/0050990 A1 | 12/2001 | Sudia |
| 2002/0013898 A1 | 1/2002 | Sudia et al. |
| 2002/0029200 A1 | 3/2002 | Dulin et al. |
| 2002/0029337 A1 | 3/2002 | Sudia et al. |
| 2002/0046340 A1 | 4/2002 | Fujishiro et al. |
| 2002/0062438 A1 | 5/2002 | Asay et al. |
| 2002/0107814 A1 | 8/2002 | Micali |
| 2002/0165824 A1 | 11/2002 | Micali |
| 2002/0184182 A1 | 12/2002 | Kwan |
| 2003/0014365 A1 | 1/2003 | Inada et al. |
| 2003/0014629 A1 * | 1/2003 | Zuccherato ................ 713/156 |
| 2003/0065921 A1 | 4/2003 | Chang |
| 2003/0130947 A1 * | 7/2003 | Benantar .................. 705/44 |
| 2003/0212888 A1 | 11/2003 | Wildish et al. |
| 2003/0221101 A1 | 11/2003 | Micali |
| 2004/0049675 A1 | 3/2004 | Micali et al. |
| 2004/0111607 A1 | 6/2004 | Yellepeddy |
| 2004/0237031 A1 | 11/2004 | Micali et al. |
| 2005/0010783 A1 | 1/2005 | Libin et al. |
| 2005/0033962 A1 | 2/2005 | Libin et al. |
| 2005/0044376 A1 | 2/2005 | Libin et al. |
| 2005/0044386 A1 | 2/2005 | Libin et al. |
| 2005/0044402 A1 | 2/2005 | Libin et al. |
| 2005/0055548 A1 | 3/2005 | Micali |
| 2005/0055567 A1 | 3/2005 | Libin et al. |
| 2005/0114653 A1 | 5/2005 | Sudia |
| 2005/0114666 A1 | 5/2005 | Sudia |
| 2005/0154878 A1 | 7/2005 | Engberg et al. |
| 2005/0154879 A1 | 7/2005 | Engberg et al. |
| 2005/0154918 A1 | 7/2005 | Engberg |
| 2005/0193204 A1 | 9/2005 | Engberg et al. |
| 2006/0987843 | 5/2006 | Libin |

FOREIGN PATENT DOCUMENTS

| | | |
|---|---|---|
| EP | 0 798 671 A2 | 2/1997 |
| EP | 1 024 239 A1 | 1/1999 |
| FR | 2 774 833 A1 | 2/1998 |
| JP | 2002-072876 | 3/2002 |
| JP | 2002-139996 | 5/2002 |
| JP | 2005-117514 | 4/2005 |
| WO | WO 98/26385 | 6/1998 |
| WO | WO 98/43152 | 10/1998 |

(56) References Cited

FOREIGN PATENT DOCUMENTS

| WO | WO 00/22787 | | 4/2000 |
|---|---|---|---|
| WO | WO 01/06701 | A1 | 1/2001 |
| WO | WO 01/11812 | A2 | 2/2001 |
| WO | WO 01/11843 | | 2/2001 |
| WO | WO 01/25874 | A2 | 4/2001 |

OTHER PUBLICATIONS

**Facsimile message from Chini Krishnan of Integris Security, Inc. to Professor Silvio Micali, dated Feb. 25, 1997, 13 pages including cover sheet, submitted in attached sealed envelope as Proprietary Material Not Open to Public. To Be Opened Only by Examiner or Other Authorized U.S. Patent and Trademark Office Employee.

"Distributed Certificate Validation: The answer to validation scalability, availability and cost issues," *CoreStreet White Paper*, published at www.corestreet.com, Jun. 12, 2003. 14 pp.

"Distributed OCSP: Security, Scalability, and Availability for Certificate Validation," *CoreStreet White Paper*, published at www.corestreet.com, 2002, 4 pp.

"Real Time Credential Validation: Secure, Efficient Permissions Management," *CoreStreet White Paper*, published at www.corestreet.com, 2002, 5 pp.

"Real Time Credential Validation: Secure, Efficient Permissions Management," *CoreStreet White Paper*, published at www.corestreet.com, 2002-2004, 5 pp.

"Identity Services Infrastructure™: A practical approach to ensuring trust and privacy in government and industry," *CoreStreet White Paper*, published at www.corestreet.com, 2006, 13 pp.

"The Roles of Authentication, Authorization & Cryptography in Expanding Security Industry Technology," Security Industry Association, *Quarterly Technical Update*, Dec. 2005, 32 pp.

"Important FIPS 201 Deployment Considerations: Ensuring Your Implementation is Future-Ready," *White paper*, published at www.corestreet.com, 2005-2006, 11 pp.

"Vulnerability Analysis of Certificate Validation Systems," *CoreStreet White Paper*, published at www.corestreet.com, 2006, 15 pp.

"The Role of Practical Validation for Homeland Security," *CoreStreet White Paper*, published at www.corestreet.com, 2002-2004, 3 pp.

"Distributed Certificate Validation," *CoreStreet White Paper*, published at www.corestreet.com, 2006, 16 pp.

"Certificate Validation Choices: Evaluation criteria for selecting the appropriate validation mechanism for your needs," *CoreStreet white paper*, published at www.corestreet.com, 2002-2004, 8 pp.

"Nonce Sense: Freshness and Security in OCSP Responses," *CoreStreet White Paper*, published at www.corestreet.com, 2003-2004, 2 pp.

"Sistema Distruito Per Il Controllo Della Validita Dei Certificati Digitali: Prestazioni—Disponibilita'—Costi," *CoreStreet White Paper*, published at www.corestreet.com, visited Aug. 7, 2006, 17 pp.

"Analisi Della Vunlerabilita' Dei Sistemi Di Convalida Dei Certificati Digitali," *CoreStreet White Paper*, published at www.corestreet.com, visited Aug. 7, 2006, 17 pp.

Jon Shamah, "From eID to Identity Services Infrastructure—Practical implementations for sustainable success," Presentation, published at www.corestreet.com, *e-ID Conference* (Brussels, Belgium), Feb. 22, 2006, 48 pp.

"U.S. Department of Homeland Security First Responders Card Initiative," Transcript, *All Hazards Forum Conference and Exhibition*, Moderator Craig A. Wilson, Baltimore, Maryland, Oct. 26, 2005, 42 pp.

"Card-Connected System," *Functional Specification*, published at www.corestreet.com, 2005, 6 pp.

"Card-Connected System," *Architects and Engineers Specification*, published at www.corestreet.com, 2005, 11 pp.

"CoreStreet Validation Authority," *CoreStreet Data Sheet*, published at www.corestreet.com, 2006, 2 pp.

"Responder Appliance 2400," *CoreStreet Data Sheet*, published at www.corestreet.com, 2006, 1 p.

"Desktop Validation Client," *CoreStreet Data Sheet*, published at www.corestreet.com, 2006, 1 p.

"Server Validation Extension," *CoreStreet Data Sheet*, published at www.corestreet.com, 2006, 1 p.

"Path Builder System™: For Federated PKI," *CoreStreet Data Sheet*, published at www.corestreet.com, 2006, 1 p.

"PKI Toolkit: Developer toolkit to enable certificate validation," *CoreStreet Data Sheet*, published at www.corestreet.com, 2006, 1 p.

"MiniCRL," *CoreStreet data sheet*, published at www.corestreet.com, 2006, 1 p.

"PIVMAN™ System: Secure ID Checking," *CoreStreet Data Sheet*, published at www.corestreet.com, 2006, 1 p.

"The PIVMAN™ System: Implementing secure ID checking for site control in emergencies," *CoreStreet Product Implementation Overview*, published at www.corestreet.com, 2006, 4 pp.

"The PIVMAN™ System: Deployment and use case overview," *CoreStreet Product Application Overview*, published at www.corestreet.com, 2006, 4 pp.

"Card-Connected™ Access Control," *Corestreet Data Sheet*, published at www.corestreet.com, 2006, 1 p.

"FIPS 201 Solutions," *Corestreet Solutions Overview*, published at www.corestreet.com, 2005, 1 p.

"Common Criteria Factsheet: Understanding the importance of certification," Corestreet *Fact Sheet*, published at www.corestreet.com, 2006, 1 p.

"Security Requirements for Cryptographic Modules," *Federal Information Processing Standards (FIPS) Publication 140-2*, Information Technology Laboratory, National Institute of Standards and Technology, Gaithersburg, MD 20899, May 25, 2001.

"Final Text of Draft Amendments DAM 4 to ISO/IEC 9594-2, DAM 2 to ISO/IEC 9594-6, DAM 1 to ISO/IEC 9594-7, and DAM 1 to ISO/IEC 9594-8 on Certificate Extensions," *ISO/IEC JTC 1/SC 21/WG 4 and ITU-T Q 15/7 Collaborative Editing Meeting on the Directory*, Dec. 1996, 54 pp.

Christoffersson et al., *Crypto User's Handbook, A Guide for Implementors of Cryptographic Protection in Computer Systems*, Elsevier Science Publishers B. V., 1988, pp. 8-85.

M. Ito, et al., "Secret Sharing Scheme Realizing General Access Structure," Dept. of Electrical Communications, Tohoku University, Sendai, Miyagi 9890, Japan, 1987, pp. 3.6.1-3.6.4.

L. Gong, "Securely replicating authentication services," *Proceedings of the International Conference on Distributed Computing Systems*, IEEE Computer Society Press, 1989. pp. 85-91.

International Search Report from PCT/US 96/17374, dated Feb. 19, 1997, 3 pp.

C.J. Mitchell and F.C. Piper, "Key Storage in Secure Networks," *Discrete Applied Mathematics*, vol. 21, No. 3, 1988, pp. 215-228.

D. Otway and O. Rees, "Efficient and timely mutual authentication," *SIGOPS Oper. Syst. Rev.* vol. 21, No. 1, Jan. 1987, pp. 8-10.

"The Digital Signature Standard," National Institute of Standards and Technology (NIST), Proposal and Discussion, *Comm. of the ACM*, 35 (7), Jul. 1992, pp. 36-54.

F. T. Leighton, "Failsafe Key Escrow Systems," *Technical Memo 483, MIT Lab. for Computer Science*, 1994, 9 pp.

B. Fox and B. LaMacchia, "Certificate Revocation: Mechanics and Meaning," *Proceedings of Financial Cryptography '98*, Lecture Notes in Computer Science 1465, Springer-Verlag, Jan. 1998, pp. 158-164.

R. Blom, "An optional class of symmetric key generation schemes," Proceedings of Advances in Cryptology-EUROCRYPT'84, Lecture Notes in Computer Science 209, Spring-Verlag, 1985, pp. 335-338.

C. Blundo, et al., "Perfectly Secure Key Distribution for Dynamic Conferences" *Proceedings of Advances in Cryptology: CRYPTO '92*, Springer-Verlag, Berlin, 1993, pp. 471-486.

D. Beaver, "Multiparty Protocols Tolerating Half Faulty Processors," *Proceedings of Advances in Cryptology '89*, Lecture Notes in Computer Science 435, G. Brassard, Ed. Springer-Verlag, London, 1990, pp. 560-572.

B. Schneier, *Applied Cryptography* $2^{nd}$ ed.; John Wiley & Sons, Inc., 1996, pp. 42-65, 574-576, 591, 593.

(56) References Cited

OTHER PUBLICATIONS

"Escrowed Encryption Standard (EES)," *Federal Information Processing Standards (FIPS) Publication 185*, Computer Systems Laboratory, National Institute of Standards and Technology, Gaithersburg, MD 20899, Feb. 1994.
S. Chokhani, "Toward a National Public Key Infrastructure," *IEEE Communications Magazine*, vol. 32, No. 9, Sep. 1994, pp. 70-74.
M. Gasser, et al., "The Digital Distributed System Security Architecture," *Proc. 12th National Computer Security Conference*, 1989, pp. 305-319.
R. L. Rivest, et al., "SDSI—A Simple Distributed Security Infrastructure," 1996, pp. 1-39.
D. L. Chaum, "Untraceable Electronic Mail, Return Addresses, and Digital Pseudonyms," Technical Note Programming Techniques and Data Structures, *Communications of the ACM*, vol. 24, No. 2, Feb. 1981, pp. 84-88.
R. Gennaro, et al., "Robust Threshold DSS Signatures," *Proc. of Advances in Cryptology: EUROCRYPT '96*, Lecture Notes in Computer Science 1070, 1996, 20 pp.
"Federal Public Key Infrastructure (PKI) Technical Specifications: Part D—Interoperability Profiles," (DRAFT) *Federal PKI Technical Workin Group, Inc.*, Cygnacom Solutions, 1995, 91 pp.
N. Nazario, "Federal Public Key Infrastructure (PKI) Version 1 Technical Specifications: Part B—Technical Security Policy," *PKI Technical Working Group*, 1996, 21 pp.
S. Chokhani and W. Ford, "Certificate Policy and Certification Practice Statement Framework," (DRAFT) *CygnaCom Solutions, Inc.*, Nov. 1996, 80 pp.
William E. Burr, et al., "A Proposed Federal PKI Using X.509 V3 Certificates," *National Institute of Standards and Technology (NIST)*, Gaithersburg, MD 20899, 1996, 8 pp.
W.E. Burr, "Public Key Infrastructure (PKI) Technical Specifications (Version 1): Part C—Concept of Operations," (DRAFT) Feb. 1996, 30 pp.
Warwick Ford, "Public-Key Infrastructure Standards," *PP Presentation*, 1996, 15 pp.
William T. Polk, "Minimum Interoperability Specifications for PKI Components," *NIST presentation*, 1996, 13 pp.
Santosh Chokhani, Ph.D., "Security Considerations in Using X.509 Certificates," *PP Presentation*, 1996, 11 pp.
Donna F. Dodson, "PKI Implementation Projects," *NIST Presentation*, 1996, 17 pp.
William E. Burr, et al., "A Proposed Federal PKI Using X.509 V3 Certificates," *NIST Presentation*, 1996, 12 pp.
Noel A. Nazario, et al., "Management Model for the Federal Public Key Infrastructure," *NIST Presentation*, 1996, 9 pp.
Noel A. Nazario, "Security Policies for the Federal Public Key Infrastructure," *NIST Presentation*, 1996, 11 pp.
William Burr, et al., "Minimum Interoperability Specification for PKI Components," *Output of NIST's Cooperative Research and Development Agreements for Public Key Infrastructure development with AT&T, BBN, Certicom, Cylink, DynCorp, IRE, Motorola, Northern Telecom, Spyrus, and VeriSign*, DRAFT Version 1, 1996.
Farrell, et al., "Internet Public Key Infrastructure Part III: Certificate Management Protocols," *Internet Draft, PKIX Working Group*, Dec. 1996.
W. Polk, ed., "Requirements for the Federal Public Key Infrastructure (Version 1) Part A: Requirements," 1996, 19 pp.
Warwick Ford, "A Public Key Infrastructure for U.S. Government Unclassified but Sensitive Applications," *NORTEL/Bell-Northern Research, National Institute of Standards and Technology*, 1995, 94 pp.
B. Garner, ed., "A Dictionary of Modern Legal Usage," Oxford Univ. Press, 1987, p. 930.
L. Harn, "Group-Oriented (t, n) threshold digital signature scheme and digital multisignature," *IEE Proc-Comput. Digit. Tech.*, vol. 141, No. 5, Sep. 1994, pp. 307-313.

Oded Goldreich, "Two Remarks Concerning the Goldwasser-Micali-Rivest Signature Scheme," *Laboratory for Computer Science, Massachusetts Institute of Technology MIT/LCS/TM-315*, Sep. 1986, 10 pp.
S. Goldwasser, et al., "The Knowledge Complexity of Interactive Proof Systems," *Society for Industrial and Applied Mathematics (SIAM) J. Comput.*, vol. 18, No. 1, Feb. 1989, pp. 186-208.
"X9-Financial Services: American National Standard X9.55/1995," *American National Standards Institute, Accredited Standards Committee X9(Working Draft)*, Jul. 3, 1996, 41 pp.
S. Micali, et al., "An Efficient Zero-Knowledge Method for Answering Is He in or Out? Questions," *Abstract of talk given at International Computer Science Institute*, Berkeley, CA, Dec. 1995.
"Information technology—Open Systems Interconnection—The Directory: Authentication framework," *International Standard ISO/IEC 9594-8*, 1995, 41 pp.
Z. Galil, et al., "Partitioned Encryption and Achieving Simultaneity by Partitioning," *Information Processing* Letters 26 (1987/88), Oct. 1987, pp. 81-88.
Paul Neil Feldman, "Optimal Algorithms for Byzantine Agreement," *Thesis submitted for Doctor of Philosophy in Mathematics at the Massachusetts Institute of Technology*, May 1988.
B. Chor, et al., "Verifiable Secret Sharing and Achieving Simultaneity in the Presence of Faults," *IEEE*, 1985, pp. 383-395.
D. Chaum, "Security Without Identification: Transaction Systems to Make Big Brother Obsolete," Communications of the ACM, vol. 28, No. 10, Oct. 1985, pp. 1030-1044.
V. Varadharajan, "Notification: A Pratical Security Problem in Distributed Systems," *Proc. of the 14th National Computer Security Conference*, National Institute of Standards and Technology / National Computer Security Center, Oct. 1-4, 1991, pp. 386-396.
Silvio Micali, "Computationally-Sound Proofs," *Laboratory for Computer Science, Massachusetts Institute of Technology*, Apr. 11, 1995, 56 pp.
Silvio Micali, *Proc. of Advances in Cryptology—CRYPTO '92*, Lecture Notes in Computer Science 740, Aug. 1992, pp. 113-138.
J. L. Abad-Peiro, et al., "Designing a Generic Payment Service," *IBM Research Division, Zurich Research Laboratory*, Nov. 1996, 26 pp.
R. Ankney, "A Certificate-Based Authorization Model," *Fisher International*, Sep. 25, 1995, 20 pp.
D. Chaum, et al., "Multiparty Unconditionally Secure Protocols," ACM-0-89791-264, 1988, pp. 11-19.
O. Goldreich, et al., "Proofs that Yield Nothing but Their Validity or All Languages in NP Have Zero-Knowledge Proof Systems," *Journal of the Association for Computing Machinery*, vol. 38, No. 1, Jul. 1999, pp. 691-729.
M. K. Franklin, et al., "Fair Exchange with a Semi-Trusted Third Party," *Proc. of the 4th ACM Conference on Computer and Communications Security*, Apr. 1997, 6 pp.
A. Fiat, et al., "How to Prove Yourself: Practical Solutions to Identification and Signature Problems," *Proc. of Advances in Cryptology: Proc. Crypto '86*, Lecture Notes in Computer Science 263, 1987, pp. 186-194.
D. Dolev, et al., "Non-Malleable Cryptography," ACM 089791-397-3, 1991, pp. 542-552.
Richard A. DeMillo, et al., "Cryptology in Revolution: Mathematics and Models," *Lecture Notes Prepared for the American Mathematical Society Short Course Held in San Francisco, CA*, Jan. 5-6, 1981, ISBN 0-8218-0041-8, 1983, pp. 152-155.
Ivan Bjerre Damgård, "Payment Systems and Credential Mechanisms with Provable Security Against Abuse by Individuals," *Proc. of Advances in Cryptology—CRYPTO '88*, 1988, pp. 328-335.
O. Goldreich, et al., "How to Play Any Mental Game or a Completeness Theorem for Protocols with Honest Majority," ACM 0-89791-221-7, 1987, pp. 218-229.
Y. Frankel, et al., "Indirect Discourse Proofs: Achieving Efficient Fair Off-Line E-Cash," *Proc. of Advances in Cryptology, ASIACRYPT '96*, Lecture Notes in Computer Science 1163, Springer Verlag, 1996, pp. 286-300.
S. Micali, "A Secure and Efficient Digital Signature Algorithm," *Technical Memo, Laboratory for Computer Science, Massachusetts Institute of Technology*, Cambridge, MA 02139, Mar. 1994, 12 pp.

(56) References Cited

OTHER PUBLICATIONS

"Initial EFF Analysis of Clinton Privacy and Security Proposal," *Society for Electronic Access, The Electronic Frontier Foundation*, Apr. 1993, 3 pp.
L. Lamport, "Password Authentication with Insecure Communication," *Communications of the ACM*, Technical Note Operating Systems, vol. 24, No. 11, Nov. 1981, pp. 770-772.
J. Linn, "Privacy Enhancement for Internet Electronic Mail: Part I—Message Encipherment and Authentication Procedures," *Network Working Group Request for Comments: 1040*, Jan. 1988, 28 pp.
S. Kent, "Privacy Enhancement for Internet Electronic Mail: Part II—Certificate-Based Key Managements," *Network Working Group Request for Comments: 1422*, Feb. 1993, 30 pp.
T. Elgamal, "A Public Key Cryptosystem and a Signature Scheme Based on Discrete Logarithms," *IEEE Transactions on Information Theory*, vol. IT-31, No. 4, Jul. 1985, pp. 469-472.
R. Hauser, et al., "Lowering Security Overhead in Link State Routing," *Computer Networks*, vol. 31, Elsevier, Apr. 1999, pp. 885-894.
S. Herda, "Non-repudiation: Constituting evidence and proof in digital cooperation," *Computer Standards & Interfaces*, vol. 17, Elsevier, 1995, pp. 69-79.
S.G. Stubblebine, "Recent-Secure Authentication: Enforcing Evocation in Distributed Systems, Security and Privacy," *Proc. of the 1995 IEEE Symposium on Security and Privacy*, Section 5, 1995, pp. 224-235.
Ronald L. Rivest and Adi Shamir, "PayWord and MicroMint: Two simple micropayment schemes," *MIT Laboratory for Computer Science 545 Technology Square*, Cambridge, Mass 02139; Wezmann Institute of Science Applied Mathematics Department, Rehovot, Israel, Apr. 27, 2001, 19 pp.
R. L. Rivest et al., "A Method for Obtaining Digital Signatures and Public-Key Cryptosystems," *Communications of the ACM*, Programming Techniques, vol. 21, No. 2, Feb. 1978, pp. 120-126.
M. Bellare, et al., "Incremental cryptography: the case of hashing and signing," *Proc. of Advances in Cryptology—CRYPTO '94*, Lecture Notes in Computer Science 839, Springer-Verlag, 1994, pp. 216-233.
M. Bellare and S. Micali, "How to Sign Given Any Trapdoor Permutation," *J. of the Assoc. for Computing Machinery*, vol. 39, No. 1, Jan. 1992, pp. 214-233.
J. C. Benaloh, "Secret Sharing Homomorphisms: Keeping Shares of a Secret Secret (Extended Abstract)," *Proc. of Advances in Cryptology—CRYPTO '86*, Lecture Notes in Computer Science 263, Springer-Verlag, 1986, pp. 216-233.
W. Johnston, et al., "Authorization and Attribute Certificates for Widely Distributed Access Control," *IEEE 7th International Workshops on Enabling Technologies: Infrastructure for Collaborative Enterprises*, 1998, 6 pp.
P. Janson and M. Waidner, "Electronic Payment over Open Networks," *IBM Zurich Research Laboratory*, Apr. 18, 1995, 9 pp.
E. D. Karnin, et al., "On Secret Sharing Systems," *IEEE Transactions on Information Theory*, vol. IT-29, No. 1, Jan. 1983, pp. 35-41.
S. Micali, and R. L. Rivest, R. L., "Micropayments Revisited," *Proc. of the the Cryptographer's Track at the RSA Conference on Topics in Cryptology* (Feb. 18-22, 2002), Lecture Notes in Computer Science 2271. Springer-Verlag, London, 2002, 149-163.
Silvio Micali, "Enhanced Certificate Revocation," *Technical Memo MIT/LCS/TM-542b, Laboratory for Computer Science, Massachusetts Institute of Technology*, Mar. 22, 1996, 10 pp.
R. Housley, et al., "Internet Public Key Infrastructure Part I: x.509 Certificate and CRL Profile," *Internet Engineering Task Force, PKIX Working Group, Internet Draft*, Mar. 26, 1996, 76 pp.
T. Elgamal, et al., "Securing Communications on the Intranet and Over the Internet," White Paper, *Netscape Communications Corporation*, Jul. 1996, 19 pp.
S. Berkovits, et al., "Public Key Infrastructure Study," Final Report, *National Institute of Standards and Technology*, Gaithersburg,, MD, Apr. 1994, 193 pp.
M. Ben-Or, et al., "Completeness Theorems for Non-Cryptographic Fault-Tolerant Distributed Computation," ACM-0-89791-264, 1988, 10 pp.

M. Ben-Or, et al., "A Fair Protocol for Signing Contracts," *IEEE Transactions on Information Theory*, vol. 36, No. 1, Jan. 1990, pp. 40-46.
G. R. Blakley, "Safeguarding cryptographic keys," *AFIPS—Proc. of the National Computer Conference*, vol. 48, 1979, pp. 313-317.
J. Camenisch, et al., "An Efficient Fair Payment System," ACM-089791-892-0, 1996, 7 pp.
J. Camenisch, et al., "Digital Payment Systems with Passive Anonymity-Revoking Trustees," *Computer Security—ESORICS '96*, Lecure Notes in Computer Science 1146, Springer Verlag, 1996, pp. 33-43.
M. Blum, "How to Exchange (Secret) Keys," *ACM Transactions on Computer Systems*, vol. 1, No. 2, May 1983, pp. 175-193.
H. Bürk, et al., "Digital Payment Systems Enabling Security and Unobservability," *Computers & Security*, vol. 8, Elsevier Science, 1989, pp. 399-416.
G. Brassard, et al., "Minimum Disclosure Proofs of Knowledge," *J. of Computer and System Sciences*, vol. 37, 1988, pp. 156-189.
D. Chaum, et al., "Untraceable Electronic Cash," *Proc. of the 8th Annual international Cryptology Conference on Proc. of Advances in Cryptology* (Aug. 21-25, 1988), Lecture Notes in Computer Science 403, Springer-Verlag, 1990, pp. 319-327.
P. Cheng, et al., "Design and Implementation of Modular Key Management Protocol and IP Secure Tunnel on AIX," *IBM Thomas J. Watson Research Center*, Yorktown Heights, NY, 10598, Apr. 28, 1995, 14 pp.
R. DeMillo, et al., "Protocols for Data Security," *Computer, IEEE*, Feb. 1983, pp. 39-50.
E-mail from Martin Hellman, "Re: Clipper-Chip Escrow-System Flaws," Apr. 16, 1993, 1 p.
E-mail from Martin Hellman, "Clipper Chip," Apr. 17, 1993, 2 pp.
E-mail from Dorothy Denning, "Re: Clipper Chip," Apr. 18, 1993, 3 pp.
Y. Desmedt, et al., "Threshold cryptosystems," *Proc. of Advances in Cryptology—CRYPTO 89*, Lecture Notes in Computer Science 435, Springer-Verlag, 1990, pp. 307-315.
W. Diffie, et al., "New Directions in Cryptography," *IEEE Transactions on Information Theory*, vol. IT-22, Nov. 1976, pp. 644-654.
S. Dukach, "SNPP: A Simple Network Payment Protocol," *Proc. of the Eighth Annual Computer Security Applications Conference*, Dec. 1992, 6 pp.
S. Even, et al., "A Randomized Protocol for Signing Contracts," *Communications of the ACM, Programming Techniques and Data Structures*, vol. 28, No. 6, Jun. 1985, pp. 637-647.
S. Even, et al., "On-line/Off-line Digital Signatures," *Proc. of Advances in Cryptology*, Springer-Verlag New York, pp. 263-275.
S. Even, et al., "Secure Off-line Electronic Fund Transfer Between Nontrusting Parties," *Computer Science Department, Technion, Israel Institute of Technology*, Haifa, Israel 32000, Jan. 31, 1988, 10 pp.
O. Goldreich, et al., "Proofs that Yield Nothing but their Validity and a Methodology of Cryptographic Protocol Design," *Proc. of 27th Symp. on Foundation of Computer Science*, 1986, pp. 174-187.
P. Feldman, "A Practical Scheme for Non-interactive Verifiable Secret Sharing," *IEEE Symposium on Foundations of Computer Science*, 1987, pp. 427-437.
A. Fiat, "Batch RSA," *Proc. of Advances in Cryptology—CRYPTO '89*, Lecture Notes on Computer Science 435, Springer-Verlag, 1989, pp. 175-185.
S. Goldwasser, et al., "A Digital Signature Scheme Secure Against Adaptive Chosen-Message Attacks," *Society for Industrial and Applied Mathematics (SIAM) J. Comput.*, vol. 17, No. 2, Apr. 1988, pp. 281-308.
L. C. Guillou, et al., "A 'Paradoxical' Identity-Based Signature Scheme Resulting from Zero-Knowledge," *Proc. of Advances in Cryptology—CRYPTO '88*, Lecture Notes in Computer Sciences 403, Springer Verlag, New York, 1990, pp. 216-231.
K. E. B. Hickman, "The SSL Protocol," Internet Draft, *Netscape Communications Corporation*, Jun. 1995, 32 pp.
M. Jakobsson, "Reducing costs in identification protocols," *Department of Computer Science and Engineering, University of California*, San Diego, La Jolla, CA 92093, 1992, 7 pp.

(56) References Cited

OTHER PUBLICATIONS

G. B. Koleta, "Cryptographers Gather to Discuss Research: Analyses of how to break codes and new ways to use codes were featured at the meeting," *Science*, vol. 214, Nov. 6, 1981, pp. 646-647.

P. Janson, et al., "Electronic Payment Systems," *ACTS Project AC026, SEMPER*, May 1, 1996, pp. 24 pp.

J. Kilian, et al., "Identify Escrow," *Proc. of Advances in Cryptology—CRYPTO '98*, 1998, 18 pp.

A. G. Konheim, "Chapter IX: Digital Signatures and Authentications," *Cryptography, A Primer*, John Wiley & Sons, 1981, pp. 331-347, 365-370.

H. Königs, "Cryptographic Identification Methods for Smart Cards in the Process of Standardization," *IEEE Communications Magazine*, Jun. 1991, pp. 42-47.

S. Low, et al., "Anonymous Credit Cards," *Proc. of the 2nd ACM Conference on Computer and Communications*, Fairfax, Virginia, 1994, 10 pp.

M. Luby, et al., "How to Simultaneously Exchange a Secret Bit by Flipping a Symmetrically-Biased Coin," *Proc. of the 24th IEEE Symposium on Foundations of Computer Science*, Tucson, Arizona, 1983, pp. 11-21.

J. Markoff, "New Communication System Stirs Talk of Privacy vs. Eavesdropping," *The New York Times*, Apr. 16, 1993, 2 pp.

J. Markoff, "Communications Plan Draws Mixed Reaction," *The New York Times*, Apr. 17, 1983, 1 pp.

T. Leighton and S. Micali, "New Approaches to Secret-Key Exchange," *Proc. of Advances in Cryptology CRYTPO '93*, 1993, 10 pp.

A. J. Menezes, Handbook of Applied Cryptography, CRC Press, 1997, pp. 566, 576-577, 588-589, 706, 716, 720, 728-729, 737.

P. D. Merillat, "Secure stand Alone Positive Personnel Identify Verification System (SSA-PPIV)," Sandia Laboratories, SAND79-0070, Mar. 1979, 21 pp.

R. C. Merkle, "A Certified Digital Signature," *Communications of the ACM*, 1979, pp. 218-238.

R. C. Merkle, "A Digital Signature Based on a Conventional Encryption Function," *Presented at CRYPTO '87*, 1987, 8 pp.

C. H. Meyer and S. M. Matyas, "Chapter 8: Authentication Techniques Using Cryptography," *Cryptography: A New Dimension in Computer Data Security*, John Wiley & Sons, 1982, pp. 350-428.

S. Micali and A. Shamir, "An Improvement of the Fiat-Shamir Identification and Signature Scheme," *Presented at CRYPTO '88*, 1988, 5 pp.

S. Micali, "Guaranteed partial key escrow," *Technical Memo, MIT/LCS TM-537*, Sep. 1995, 13 pp.

S. Micali and A. Shamir, "Partial Key-Escrow," *MIT Laboratory for Computer Science*, Cambridge, MA 02139 and Weizmann Institute Computer Science Department, Rehovot, Israel, Feb. 1996, 13 pp.

S. Micali, "Fair Cryptosystems," *Technical Memo, MIT/LCS TM-579.b*, Nov. 1993, 36 pp.

Website pages @ http://www.valicert.com, Sep. 23, 2002, 8 pp.

T. P. Pedersen, "Electronic payments of small amounts," *Technical report, Aarhus University, Computer Science Department*, Aug. 1995, 12 pp.

T. P. Pedersen, "Distributed Provers with Applications to Undeniable Signatures," *Proc. of Advances in Cryptology—EUROCRYPT '91*, Lecture Notes in Computer Science 547, Springer-Verlag, 1991, pp. 221-242.

Donn B. Parker, "Chapter 43: Public Key Cryptosystems," *Fighting Computer Crime*, Charles Scribner's Sons, New York, 1983, pp. 327-334.

John Droge, "Mykotronx Develops New Chip to Protect Digital Data," Press Release, Mykotronx, Inc., Torrence, California, 1992, 3 pp.

Barbara Fox, "Certificate Revocation: Mechanics and Meaning," *Microsoft Corporation, Introductory Remarks for Panel Discussion with J. Feigenbaum, P. Kocher, M Myers and R. Rivest,*, 1998, 8 pp.

David Mutch, "Electronics Industry Wants to Offer V-Chip of Its Own," *The Christian Science Monitor*, Sep. 25, 1995, 3 pp.

S. Micali and P. Rogaway, "Secure Computation," *Proc. of Advances in Cryptology: CRYPTO '91*, Lecture Notes in Computer Science 576, Springer, 1991, pp. 392-404.

C. Mueller-Scholor and N. R. Wagner, "The implementation of a cryptography-based secure office system," *AFIPS Proc. of the National Computer Conference*, 1982, pp. 487-492.

M. Noar and M. Yung, "Universal One-Way Hash Function and their Cryptographic Applications," ACM 0-89791-307-8, 1989, pp. 33-43.

R. M. Needham and M. D. Schroeder, "Using Encryption for Authentication in Large Networks of Computers," *Communications of the ACM, Operating Systems*, vol. 21, No. 12, Dec. 1978, pp. 993-999.

H. Ong and C.P. Schnorr, "Fast Signature Generation with a Fiat-Shamir-Like Scheme," *Proc. of Advances in Cryptology—EUROCRYPT '90*, Lecture Notes in Computer Science 473, Springer-Verlag, 1991, pp. 432-440.

M. O. Rabin, "Digitalized Signatures and Public-Key Functions as Intractable as Factorization," Technical Report, MIT/LCS/TR-212, Jan. 1979, 17 pp.

T. Rabin and M. Ben-Or, "Verifiable Secret Sharing and Multiparty Protocols with Honest Majority," ACM 0-89791-307-8, 1989, pp. 73-85.

M. O. Rabin, "Transaction Protection by Beacons," Harvard University Center for Research in Computing Technology, TR-29-81, Nov. 1981, 21 pp.

Michael O. Rabin, "How to Exchange Secrets," May 20, 1981, 21 pp.

E. Rescorla and A. Schiffman, "The Secure HyperText Transfer Protocol," Internet Draft, *Web Transaction Security Working Group Enterprise Integration Technologies*, Jul. 1995, 36 pp.

K. Rihaczek, "Teletrust," *Computer Networks and ISDN Systems*, vol. 13, 1987, pp. 235-239.

"Statement by the Press Secretary," *The White House, Office of the Press Secretary*, Apr. 16, 1993. 6 pp.

C. P. Schnorr, "Efficient Identification and Signatures for Smart Cards," *Proc. of Advances in Cryptology—Crypto 89*, G. Brassard (ed.), Lecture Notes in Computer Science 435, Springer-Verlag, 1990, pp. 239-251.

J. M. Blachere and M. Waidner, "SEMPER," *Project AC026*, Document 431ZR031, 1995, 46 pp.

Bob Serenelli and Tim Leisher, "Securing Electronic Mail Systems," *Communications—Fusing Command, Control and Intelligence, MILCOM '92*, Conference Record, vol. 2, 1992, pp. 677-680.

A. Shamir, "How to Share a Secret," *Programming Techniques, Communications of the ACM*, vol. 22, No. 11, Nov. 1979, pp. 612-613.

A. Shamir, "Identity-based cryptosystems and signature schemes," *Proc. of Advances in Cryptology, CRYPTO 84*, G. R. Blakley and D. Chaum (Eds.), Springer-Verlag, 1985, pp. 47-53.

*Contemporary Cryptology*, G. J. Simmons (Ed.), IEEE Press, New York, 1991, pp. 348-350, 617-630.

G. J. Simmons, "How to (Really) Share a Secret," *Proc. of Advances in Cryptology—Crypto 88*, S. Goldwasser (ed.), Lecture Notes in Computer Science 403, Springer-Verlag, 1988, pp. 390-448.

G. J. Simmons, "An Impersonation-Proof Identify Verification Scheme," *Proc. of Advances in Cryptology—Crypto 87*, C. Pomerance (Ed.), Lecture Notes in Computer Science 293, Springer-Verlag, 1987, pp. 211-215.

G. J. Simmons, "A Protocol to Provide Verifiable Proof of Identity and Unforgeable Transaction Receipts," *IEEE Journal on Selected Areas in Communications*, vol. 7, No. 4, May 1989, pp. 435-447.

G. J. Simmons, "Scanning the Issue," and "How to Insure that Data Acquired to Verify Treaty Compliance are Trustworthy," *Proc. of the IEEE*, vol. 76, No. 5, May 1988, pp. 515-518 and 621-627.

G. J. Simmons, "A System for Verifying User Identity and Authorization at the Point-of Sale or Access," Cryptologia, vol. 8, No. 1, Jan. 1984, 21 pp.

G. J. Simmons and G. B. Purdy, "Zero-Knowledge Proofs of Identity and Veracity of Transaction Receipts," *Proc. of Advances in Cryptology—Eurocrypt '88*, Lecture Notes in Computer Science 330, C. G. Gunther (Ed.), Springer-Verlag New York, 1988, pp. 35-49.

M. Sirbu and J. D. Tygar, "NetBill: An Internet Commerce System Optimized for Network Delivered Services," *IEEE Personal Communications*, Aug. 1995, 13 pp.

(56) References Cited

OTHER PUBLICATIONS

J. L. Snare, "Secure Electronic Data Interchange," *Computer Security in the Age of Information*, W. J. Caelli (Ed.), Elsevier Science Publishers B.V., 1989, pp. 331-342.

K. R. Sollins, "Cascaded Authentication," *Proc. of the 1988 IEEE Symposium on Security and Privacy*, 1988, pp. 156-163.

M. Stadler, et al., "Fair Blind Signatures," *Proc. of Advances in Cryptology—Eurocrypt '95*, Lecture Notes in Computer Science 921, Springer-Verlag, 1995, pp. 209-219.

L. H. Stein, et al., "The Green Commerce Model," Internet Draft, Oct. 1994, 18 pp.

G. Tsudik, "Zurich iKP Prototype (ZiP): Protocol Specification Document," *IBM Zurich Research Lab*, Mar. 5, 1996, 30 pp.

V. Varadharajan and S. Black, "Formal Specification of a Secure Distributed Messaging System," *Proc. of the 12$^{th}$ National Computer Security Conference*, Oct. 1989, pp. 146-171.

M. Waidner, "Development of a Secure Electronic Marketplace for Europe," *Proc. of ESORICS 96*, Rome, Sep. 1996, 15 pp.

M. Wegman, "One-Time Pad Digitial Signature Technique," *IBM Technical Disclosure Bulletin*, vol. 21, No. 3, Aug. 1978, pp. 1316-1318.

H. C. Williams, "A Modification of the RSA Public-Key Encryption Procedure," *IEEE Transactions on Information Theory*, vol. IT-26, No. 6, Nov. 1980, pp. 726-729.

A. C. Yao, "Protocols for Secure Computations," *Proc. of the 23rd Symp. on Foundation of Computer Science*, IEEE, 1982, pp. 160-164.

J. Zhou and D. Gollman, "A Fair Non-repudiation Protocol," *Proc. of the 1996 IEEE Symposium on Security and Privacy*, 1996, pp. 55-61.

D. Pinkas, et al., RSA Laboratories, "Delegated Path Validation and Delegated Path Discovery Protocol Requirements," Sep. 2002, XP015009138.

* cited by examiner ions 60/523,398 filed on Nov. 19, 2003, which is incorporated by reference herein.

DISTRIBUTED DELEGATED PATH DISCOVERY AND VALIDATION

CROSS-REFERENCE TO RELATED APPLICATIONS

This application claims priority to U.S. provisional application 60/523,398 filed on Nov. 19, 2003, which is incorporated by reference herein.

BACKGROUND OF THE INVENTION

1. Technical Field

This application relates to the field of data security and validation, and more particularly to the field of verifying and validating digital certificates and other information.

2. Description of Related Art

It is useful to be able to determine the status of a digital certificate, including determining whether the certificate was validly issued and/or whether the certificate has been revoked prior to the expiration thereof. There are a number of techniques for determining the status of an individual digital certificate. For example, U.S. Pat. Nos. 5,666,416 and 5,717,758 describe techniques for providing individual certificate status. Other techniques for disseminating and ascertaining certificate status are also known, including Certificate Revocation Lists (CRL's), which are digitally-signed list of revoked certificates.

Verifying a digital certificate may require having to trust the issuer of the digital certificate and/or trust the signer of the revocation information, which may or may not be the same entity. In the case of a digital certificate, "trusting" an issuer and/or a signer of revocation information may refer to the fact that the issuer and/or signer is a known authority having a valid public key corresponding to a secret key that was used to sign the certificate and/or the revocation information. For example, a user may receive a digital certificate that is digitally signed by an authority, A, and may also receive an up-to-date CRL (that does not contain the digital certificate) signed by a different authority, A'. However, the user would want to be able to trust both A and A' along with their public keys (corresponding to the secret keys used to sign the certificate and the CRL) in order to be able to honor the certificate.

There are mechanisms for facilitating dissemination and trust of otherwise unknown authorities that issue certificates and revocation information. In some instances, it is possible to have a trusted authority digitally sign information (or otherwise validate the information) to verify an otherwise unknown authority. Thereafter, the previously-unknown authority may present digitally-signed information (e.g., a digital certificate and/or revocation information) that may be verified using the public key of the previously-unknown authority. For example, if a user does not know or trust the digital signature of authorities A1 and A2, but the user does know and trust authority A3, then the user may obtain (or be presented with) information digitally signed by A3 (and thus vouched for by A3) indicating that A1 and A2 are trustworthy authorities. Thus, if such a user were presented with a digital certificate signed by A1 and a CRL (that does not list the digital certificate) signed by A2, the user would use the information vouched for by A3 to verify the validity of the presented certificate.

There are also nesting mechanisms that may be used in instances where authorities vouch for other authorities. For example, U.S. Pat. No. 5,717,759, which is incorporated by reference herein, discloses a technique where a first authority, A1, vouches for a second authority, A2, who vouches for a third authority, A3, etc. until the nesting reaches an authority trusted by a potential user. In some instances, vouching may include providing a digital signature of the vouching authority.

Although nesting and other mechanisms are useful, in some cases a user may be presented with a digital certificate and/or revocation information and/or some other information for which there is no straight-forward mechanism for determining whether the signer of the certificate/revocation information/other information may be trusted and thus the user may not be able to determine whether the digital certificate is currently valid. Accordingly, it would be useful to address this.

SUMMARY OF THE INVENTION

According to the present invention, providing path validation information for a system includes determining paths between a subset of certificates of the system and at least one trust root, storing each of the paths in a table prior to a request for path validation information, and fetching the validation information stored in the table in response to a request for path validation information. Providing path validation information may also include digitally signing the validation information. Providing path validation information may also include applying constraints to the validation information and only providing validation information that is consistent with the constraints. Determining paths may include constructing a directed graph of trusted roots and the subset of certificates and performing a depth-first acyclic search of the graph. The table may be indexed using the trusted roots or using the certificates. Providing path validation information may also include receiving proofs of revocation status for the subset of certificates, storing the proofs prior to a request for path validation information, and fetching the proofs along with the validation information in response to a request for path validation information. Providing path validation information may also include digitally signing the validation information and the proofs. Providing path validation may also include applying constraints to the validation information and only providing validation information that is consistent with the constraints. Determining paths may include constructing a directed graph of trusted roots and the subset of certificates and performing a depth-first acyclic search of the graph. The proofs may be stored in the table that contains the validation information. The table may be indexed using the trusted roots. The table may be indexed using the certificates. The proofs may be stored in an other table that is separate from the table that contains the validation information. The other table may be indexed using the trusted roots or using the certificates. The subset of certificates may include trusted roots, authorities that issue end user certificates, and authorities that vouch for other authorities. The subset of certificates may also include end user certificates.

According further to the present invention, a computer program product that provides path validation information for a system includes a storage medium that contains executable code for the computer program product, executable code that determines paths between a subset of certificates of the system and at least one trust root, executable code that stores each of the paths in a table prior to a request for path validation information, and executable code that fetches the validation information stored in the table in response to a request for path validation information. The computer program product may also include executable code that digitally signs the validation information. The computer program product may also include executable code that applies constraints to the validation information and that only provides validation information that is consistent with the constraints. Executable code that determines paths may construct a directed graph of trusted roots and the subset of certificates and may perform a depth-first acyclic search of the graph. The table may be indexed using the trusted roots. The table may be indexed using the certificates. The computer program product may also include executable code that receives proofs of revocation status for the subset of certificates, executable code that stores the proofs prior to a request for path validation information, and executable code that fetches the proofs along with the validation information in response to a request for path validation information. The computer program product may also include executable code that digitally signs the validation information and the proofs. The computer program product may also include executable code that applies constraints to the validation information and only provides validation information that is consistent with the constraints. Executable code that determines paths may construct a directed graph of trusted roots and the subset of certificates and may perform a depth-first acyclic search of the graph. The proofs may be stored in the table that contains the validation information. The table may be indexed using the trusted roots or using the certificates. The proofs may be stored in an other table that is separate from the table that contains the validation information. The other table may be indexed using the trusted roots or using the certificates. The subset of certificates may include trusted roots, authorities that issue end user certificates, and authorities that vouch for other authorities. The subset of certificates may also include end user certificates.

According further to the present invention, a server includes a processor, internal storage coupled to the processor, executable code, provided on the internal storage, that determines paths between a subset of certificates and at least one trust root, executable code, provided on the internal storage, that stores each of the paths in a table prior to a request for path validation information, and executable code, provided on the internal storage, that fetches the validation information stored in the table in response to a request for path validation information. The server may include executable code, provided on the internal storage, that digitally signs the validation information. The server may include executable code, provided on the internal storage that applies constraints to the validation information and that only provides validation information that is consistent with the constraints. Executable code that determines paths may construct a directed graph of trusted roots and the subset of certificates and performs a depth-first acyclic search of the graph. The table may be indexed using the trusted roots or using the certificates. The server may include executable code, provided on the internal storage, that receives proofs of revocation status for the subset of certificates, executable code, provided on the internal storage, that stores the proofs prior to a request for path validation information, and executable code, provided on the internal storage, that fetches the proofs along with the validation information in response to a request for path validation information. The server may include executable code, provided on the internal storage, that digitally signs the validation information and the proofs. The server may include executable code, provided on the internal storage, that applies constraints to the validation information and only provides validation information that is consistent with the constraints. Executable code that determines paths may construct a directed graph of trusted roots and the subset of certificates and may perform a depth-first acyclic search of the graph. The proofs may be stored in the table that contains the validation information. The table may be indexed using the trusted roots or using the certificates. The proofs may be stored in an other table that is separate from the table that contains the validation information. The other table may be indexed using the trusted roots or using the certificates. The subset of certificates may include trusted roots, authorities that issue end user certificates, and authorities that vouch for other authorities. The subset of certificates may also include end user certificates.

DETAILED DESCRIPTION OF VARIOUS EMBODIMENTS

Figure 2:
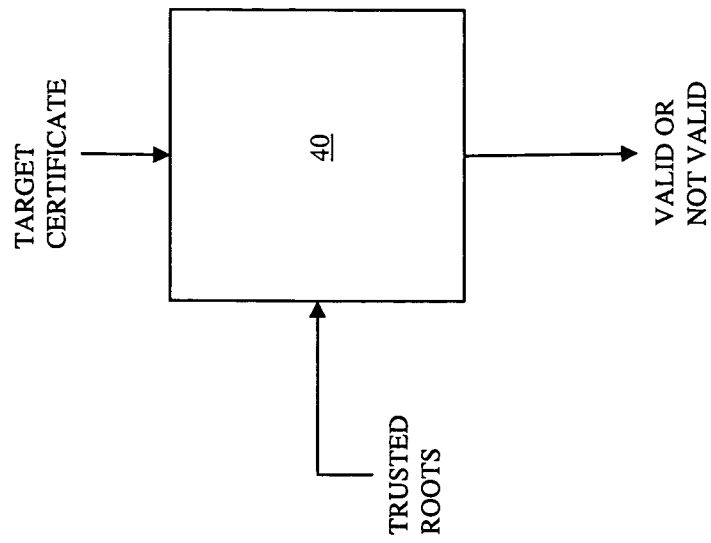
FIG. 2 illustrates a trusted delegated path/validation server according to an embodiment of the system described herein.

Techniques for providing individual certificate status information are known as are techniques for verifying certificates and/or authorities that digitally sign certificates. See, for example, the disclosure provided in U.S. Pat. Nos. 5,420,927; 5,604,804; 5,610,982; 6,097,811; 6,301,659; 5,793,868; 5,717,758; 5,717,757; 6,487,658; and 5,717,759, all of which are incorporated by reference herein. The system described herein may use techniques disclosed in one or more of these patents, possibly in combination with one or more other appropriate techniques. Techniques that may be used include, alone or in any combination, full CRL's, partitioned CRL's, delta CRL's, OCSP responses (individually and in groups), mini CRL's (bitwise compressed CRL's), VTokens (one-way hash chain), and various Merkle tree or other tree incarnations.

Path discovery relates to the process of finding a trust path (trust relationship) between an arbitrary certificate and one of a user's trust roots, which are digital certificates corresponding to authorities trusted by a user. A trust path is a chain of authorizations from one certificate to another having a target certificate at one end and a trust root at the other. For example, if certificate C1 corresponds to a trusted authority A1, and A1 signs C2 for unknown authority A2 and authority A2 signs certificate C3 for unknown authority A3 that signed the target certificate, then a trust path from C1 (the trust root) to the target certificate is C1 to C2, C2 to C3, and C3 to the target certificate.

In some cases, path discovery may be performed locally in a fairly straight-forward manner by the user whenever all of the certificates in a trust path are locally available. However, in some cases, including those with a federated trust model based on cross-certification, users may not have all of the information needed to perform local path discovery.

Note also that, even when a complete trust path has been found between a trust root and a target certificate, there still may be a concern that one or more of the certificates on the trust path may have been revoked since the issuance thereof. Path validation refers to confirming the current status of all of the certificates in a trust path, including the validity thereof (revocation status) of the certificates as well as taking into account any and all rules and/or constraints corresponding to use of the certificates (e.g., checking security policies). Assembling the revocation status information for each certificate in the trust path may be relatively difficult for some users in some situations (e.g. those in special firewall settings preventing access to public networks). Accordingly, it is useful to be able to provide a service that can verify a certificate in a single transaction. This may be done by first determining the trust path, receiving revocation information (and/or constraint information) about the certificates in the trust path, and processing the received information to verify the target certificate.

Figure 1:
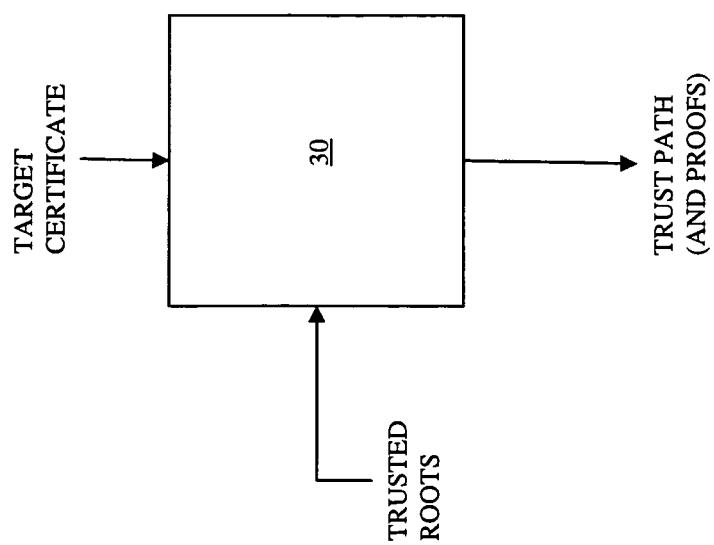
FIG. 1 illustrates a untrusted delegated path/validation server according to an embodiment of the system described herein.

Referring to FIG. 1, an untrusted delegated path discovery/validation (UDPDV) server 30 receives, as input, information identifying one or more trust roots (certificates for trusted authorities) and an identifier corresponding to a target certificate (or perhaps some other information/data) that a user desires to validate. Optionally, the UDPDV server 30 may be pre-configured with trust roots in addition to, or instead of, receiving trust roots as input.

Of course, if the user already trusts an authority that issued the target certificate and the user has access to reliable revocation information for the target certificate (and possibly the trusted authority's certificate), then the user can verify the target certificate with that information and it may not be necessary to use the UDPDV server 30. Accordingly, the UDPDV server 30 is useful in instances where a user wants to verify the status of a target certificate for which the user does not trust (know) the authority that issued the target certificate and/or for which the user does not posses reliable revocation information about the target certificate (and possibly the certificate of the authority that issued the target certificate).

The UDPDV server 30 processes the inputs thereto to determine one or more trust paths between the target certificate and a trust root (either input or preconfigured into the UDPDV server 30, as described above). Note that, in many instances, it may also be useful to confirm that none of the certificates in a trust path have been revoked (indicating, for example, compromise of an authority's secret key). In such a case, it may be useful to have the UDPDV server 30 also provide proofs in the form of authenticated revocation information (e.g., CRL's or OCSP responses). Accordingly, in some embodiments, the UDPDV server 30 may also provide proofs for certificates in a trust path.

Thus, in the embodiment disclosed in FIG. 1, the UDPDV server 30 assembles the trust path information for the target certificate and, optionally, also assembles revocation information for path elements. The output of the UDPDV server 30 to the user may not be independently authenticated (e.g. signed). Instead, the UDPDV server 30 returns all of the individual elements of the trust path (and, optionally, proofs) to the user, who may then independently verify the correctness of the trust path and the validity of the elements (certificates) thereof. Operation of the UDPDV server 30 is described in more detail elsewhere herein.

Referring to FIG. 2, a trusted delegated path discovery/validation server 40 receives, as input, a user's trust roots and an identifier corresponding to a target certificate (or perhaps some other information/data) that a user desires to verify. Optionally, the trusted delegated path discovery/validation server 40 may be pre-configured with trust roots in addition to, or instead of, receiving the trust roots as input.

The trusted delegated path discovery/validation server 40 outputs a result indicating whether or not the target certificate (or other information/data) is valid. In an embodiment described herein, the server 40 performs its own cryptographic authentication of the information that is provided to the user. In this embodiment, the server 40 may sign responses provided thereby, which would allow the server 40 to provide a small volume of data to the user (e.g. "Yes, you can trust certificate X"). However, such an implementation provides that the user explicitly trust the integrity and correctness of the internal operations of the trusted delegated path discovery/validation server 40. If the server 40 is compromised, the server 40 could be improperly used to authenticate responses that validate any certificate, regardless of source or current status.

The servers 30, 40 may be provided by computer workstations having processors and internal storage for storing executable code and data, one or more software modules provided in a general purpose computer, dedicated hardware, or any combination of hardware and software capable of providing the functionality described herein. For the system described herein, the UDPDV server 30 may be provided by one or more lightweight servers that do not need to have authentication capabilities (e.g. private keys for digital signatures).

The UDPDV server 30 may be periodically configured with lists of information of two types. The first type of list contains a set of certificates which may be used in path validation and, in an embodiment herein, represents all or nearly all certificates accessible (e.g., via a network) to the UDPDV server 30. In another embodiment, the first type of list contains certificates only for authorities that issue certificates and revocation information and for authorities that vouch for those authorities, without necessarily contain all or even any end user certificates. The first type of lists may contain self-signed root certificates (trusted roots) which serve as trust anchors. The trusted roots may be signed by authorities trusted by the user(s) of the system. The first type of lists may also contain issuer (aka "certificate authority") certificates for authorities that issue certificates, authorities that issue revocation information, and/or authorities that vouch for other authorities. In one embodiment, the first type of lists may also contain end user certificates while in another embodiment, the first type of lists does not contain end user certificates. The first type of lists of certificates may be used to provide path discovery services, as described herein.

The second type of list provided in the UDPDV server 30 may include pre-generated certificate status proofs. Each proof may contain the status of one or more certificates (from the first list) for a fixed interval of time, and the proof may be securely authenticated, e.g. using a digital signature. The proofs may be used to provide path validation services, as described elsewhere herein. The proofs may be provided by any appropriate means, including CRL's, OCSP responses, VTokens, etc.

Checking a path between a trusted root and a target certificate is known in the art and well documented in certificate standards (e.g., RFC 3280). However, finding a trust path through a large number of certificates may take exponential time based on the number of certificates in the pool. This may be acceptable in some situations and/or for small collections of certificates, but may be unacceptably in other situations, such as a large community of federated authorities.

The system described herein is designed to perform path discovery in logarithmic or constant time at the time of a discovery request by first pre-calculating trust paths between each trusted root certificate and all other reachable certificates for authorities that issue certificates and/or vouch for other authorities. When the UDPDV server 30 receives a new list of certificates (or is coupled to a source of new certificates), the server may pre-compute an M by N matrix where M is the number of trusted roots and N is the total number of certificates. Each cell in the matrix (e.g., at row r1 and column c1) may contain one or more legitimate paths from the specific trusted root indicated by the row r1 to the specific certificate indicated by the column c1, or else contain an empty set to indicate that no paths are possible. Optionally, each cell (or each cell of an analogous table) may also contain appropriate proofs to provide validation.

When a user request for verification of a target certificate arrives, the UDPDV server 30 uses the pre-computed matrix to look up the trusted root(s) for the user and to look up the authority that issued the target certificate and, optionally, to an authority that issued revocation information for the target certificate (if different from the issuing authority) to find one or more valid paths therebetween. This may be performed in a constant time look-up since the paths have been pre-calculated and stored in the UDPDV server 30. Note that if there is more than one possible trust path or if there are constraints associated with a trust path (e.g. name or policy constraints) that limit in any way the usage of any of the certificates in the trust path, then the path policies need to be applied against any trust path(s) found. By pre-computing all possible paths, the UDPDV server 30 may offer path discovery for large communities with relatively high performance and scalability.

In addition to path discovery, the UDPDV server 30 may also provide validation information (proofs) for elements (certificates) of a trust path. In one embodiment, the UDPDV server 30 obtains the proofs (e.g. in the form of a CRL or OCSP response) in real time for each element (certificate) in a trust path which is then provided to the user. Although it may be possible to improve performance by caching proofs, there still may be the potential for non-optimal performance at the time of a request when proofs are obtained in real time. In another embodiment, there may be a path validation mechanism in the UDPDV server 30 that receives at regular intervals pre-generated, fine-grained status proofs for each certificate used by the UDPDV server 30 in connection with generating trust paths. For this embodiment, the UDPDV server 30 may be able to quickly access all needed validation information that may be provided to relying parties without requiring any extra processing time to retrieve the certificate status information for validation at real time.

Note also that, if the proofs are pushed to the UDPDV server 30 (e.g. in the form of pre-signed OCSP responses), the UDPDV server 30 may have instant local access to the status of every certificate in a trust path. For some embodiments, the UDPDV server 30 confirms the status of the trust path before returning the trust path for path delegation. The UDPDV server 30 may also optionally return the status proofs to the user to permit local complete validation of the trust path by the user. The individualized, pre-generated nature of the proofs (e.g. pre-generated OCSP responses) may allow an efficient use of networking resources while avoiding any security risks that may be associated with trusted online servers.

Figure 3:
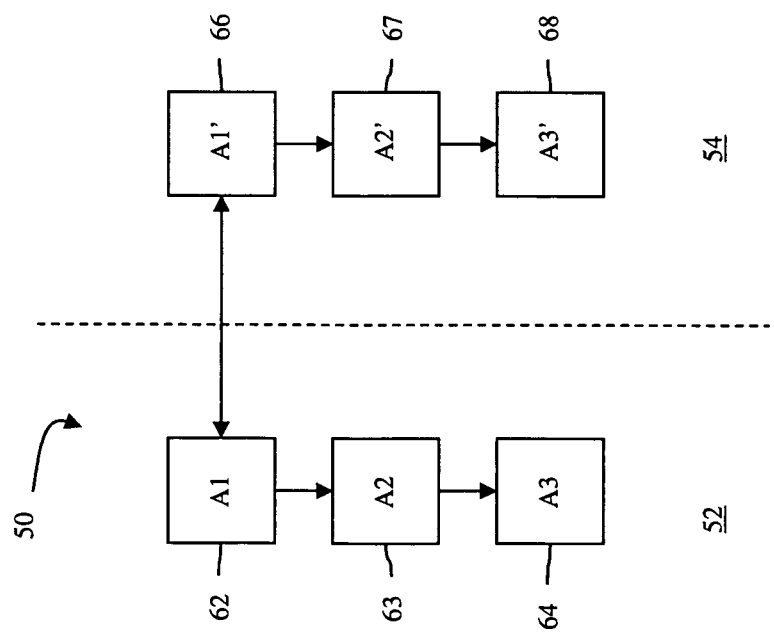
FIG. 3 illustrates two interconnected areas, each containing local certificate information according to an embodiment of the system described herein.

Referring to FIG. 3, a diagram 50 shows a first area 52 and a separate second area 54. The areas 52, 54 may be interconnected by any appropriate means (e.g., a network or direct connection) to enable an exchange of signals therebetween. The first area 52 includes a plurality of certificates 62-64. The second area 54 includes a plurality of different certificates 66-68. The first area 52 represents a locality that may be managed and accessed locally by a user therein. Similarly, the second area 54 represents a separate locality that may be managed and accessed locally by a different user therein. Thus, for example, a user in the area 52 may locally access any or all of the certificates 62-64.

At the area 52, the certificate 62 is a self-certifying root certificate (trusted root) for an authority A1. The certificate 62 also certifies the certificate 63 for an authority A2 by, for example, having A1 sign the certificate 63. The certificate 63 certifies the certificate 64 for an authority A3. Note that, in this example, if a user trusts A1, then the user should also trust A2 (vouched for by A1) and should also trust A3 (vouched for by A2). At the area 54, the certificate 66 is a self-certifying root certificate (trusted root) for an authority A1'. The certificate 66 also certifies the certificate 67 for an authority A2' and the certificate 67 certifies the certificate 68 for an authority A3'. The certificate 62 is cross-certified with the certificate 66 so that each of the certificates 62, 66 certifies the other one of the certificates 62, 66.

If a user at the area 52 is presented with a target certificate signed by A3', the user may not be able to immediately verify that the target certificate is valid if the user at the area 52 only initially knows about (and trusts) A1, A2, and A3. However, note that the authority A2' vouches for the authority A3' and that the authority A1' vouches for the authority A2'. Note also that the authority A1 vouches for the authority A1'. Thus, assuming a local user at the area 52 trusts A1, then there is a trust path for the user from the certificate 62 to the certificate 66 to the certificate 67 to the certificate 68 to the target certificate that has been signed by A3'. Thus, the user may accept the target certificate signed by the authority A3' because of the trust path from the target certificate to the certificate 62 that has been signed by the trusted authority A1. Also, as discussed elsewhere herein, it is possible to provide validation information (proof of validity) for each of the certificates along the trust path as well as for any authority that issued revocation information (if different from the issuing authority) so that, in the example the user that receives the trust path may also receive up-to-date revocation information for the certificates 62, 66-68.

Figure 4:
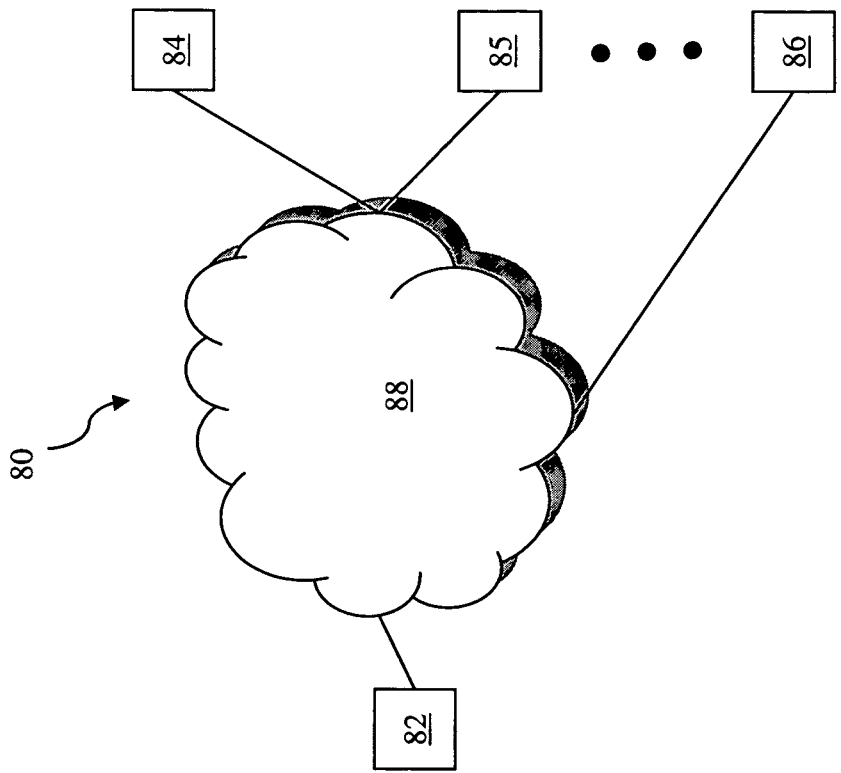
FIG. 4 illustrates using a network to communicate certificate information to a user according to an embodiment of the system described herein.

Referring to FIG. 4, a diagram 80 illustrates a user 82 receiving certificate information (including trust path information and possibly validation information) from one or more of a plurality of data storage devices 84-86 coupled to the user 82 by a network 88. In an embodiment herein, the network 88 may be the Internet, although other suitable networks may be used, including networks that provide direct connections between the user and one or more of the data storage devices 84-86. Note also that the user 82 may locally store some certificate information. In an embodiment herein, the user 82 may be presented with one or more certificates that the user desires to determine the validity thereof. In some cases, the user 82 may determine the validity of the certificates using local data. However, as described elsewhere herein, it may be necessary in other cases for the user 82 to obtain certificate information from other sources like the data storage devices 84-86. In such cases, certificate information and requests therefor may be communicated between the user and the storage devices 84-86 over the network 88 in a straight-forward manner. Of course, any appropriate connectivity and information request/transmission techniques may be used to provided the functionality described herein.

Figure 5:
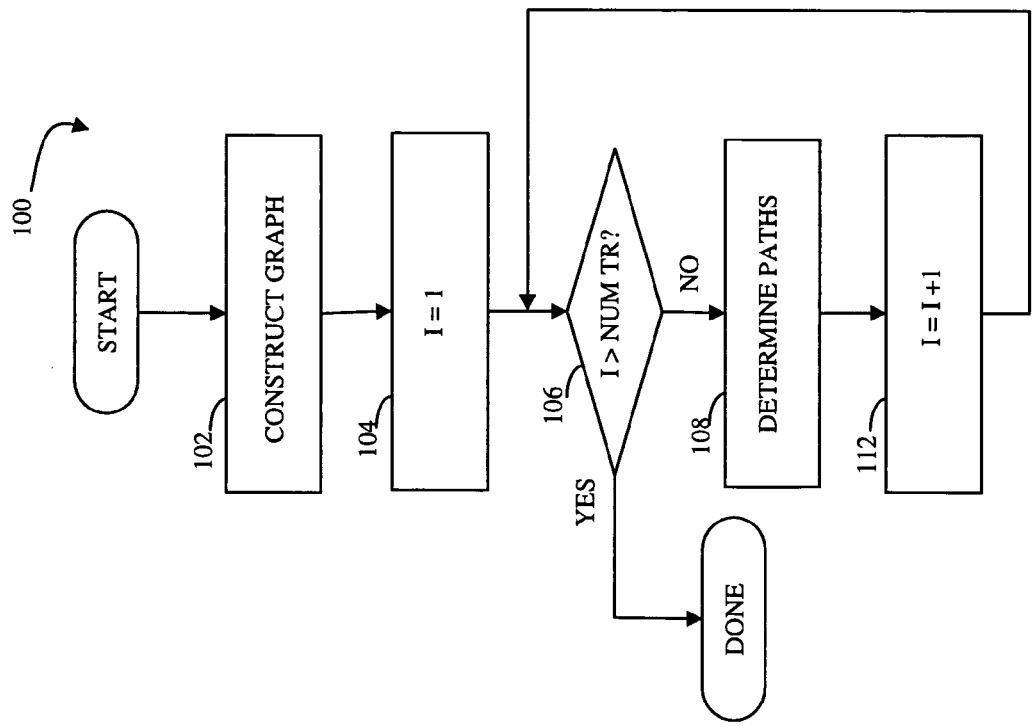
FIG. 5 is a flow chart illustrating pre-calculating trust paths according to an embodiment of the system described herein.

Referring to FIG. 5, a flow chart 100 illustrates initializing the UDPDV server 30 to contain all of the paths between the trusted roots (root certificates for trusted authorities) and one or more other certificates that issue certificates and/or vouch for other authorities. As discussed elsewhere herein, each of the trust paths may be pre-computed so that when a user presents a target certificate, the UDPDV server may consult a table, look up the authority that issued the target certificate (or look up the target certificate itself), and provided a pre-computed trust path from the target certificate to a trusted root certificate. As also discussed herein, the UDPDV server 30 may optionally provide, for the certificates in the trust path, proofs indicating that the certificates have not been revoked.

Processing for the flow chart 100 begins at a first step 102 where a directed graph is constructed for all of the certificates for which information is to be stored. A directed graph is a mathematical construct that is well-known in the art. For an embodiment herein, all of the certificates in a system, including end user certificates, are used. For another embodiment, end user certificates are not included or, alternatively, only some end user certificates are included. At the step 102, the directed graph that is constructed represents a trust relationship between certificates where an edge (connecting line) of the graph indicates that a first authority (corresponding to a certificate connected at one end of the edge) has vouched for a second authority (corresponding to a certificate connected at the other end of the edge).

Following the step 102 is a step 104 where an index variable, I, is set equal to one. The index variable, I, is used to iterate through each of the trusted root certificates for the UDPDV server 30. As discussed elsewhere herein, the trusted root certificates are provided as an input to or are pre-configured in the UDPDV server 30.

Following the step 104 is a test step 106 where it is determined if the index variable, I, is greater than the number of trusted root certificates. If so, then processing is complete. Otherwise, control transfers from the test step 106 to a step 108 to determine all of the paths from the trusted root certificate (corresponding to the index variable, I) to all of the other certificates in the directed graph. The step 108 is discussed in more detail elsewhere herein. Following the step 108 is a step 112 wherein the index variable, I, is incremented. Following the step 112, control transfers back to the test step 106, discussed above.

Figure 6:
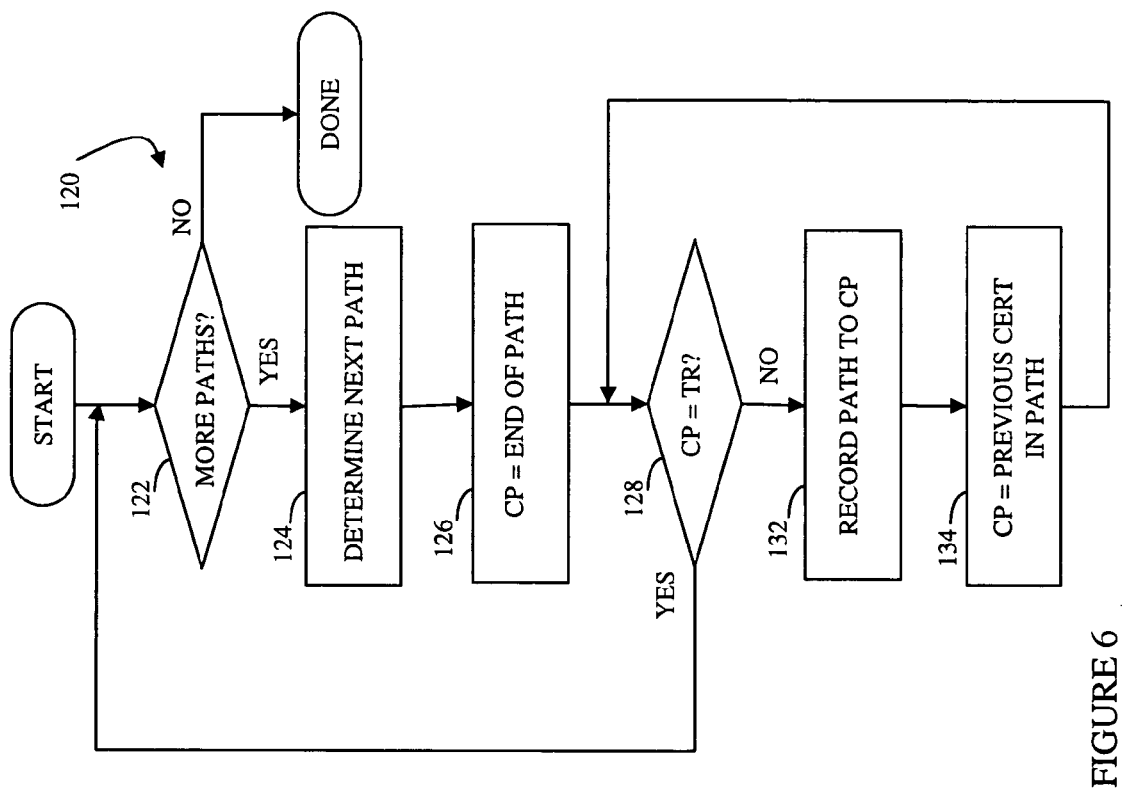
FIG. 6 is a flow chart illustrating iterating through trust paths in connection with populating a table of certificates and trust paths according to the system described herein.

Referring to FIG. 6, a flow chart 120 illustrates in more detail processing performed in connection with the step 108 of the flow chart 100 of FIG. 5. For each of the trusted roots, a depth-first acyclic search of the directed graph is performed to find all of the trust paths. For each certificate that is found in each path, an entry is made in a table indicating the trusted path from the certificate to the trusted root.

Processing begins at a first step 122, where it is determined if there are more paths to be examined. Note that, in some instances, it may be possible to have a trusted root with no paths thereto. However, in most cases, it is expected that each of the trusted roots will have at least one path thereto. If it is determined at the test step 122 that there are no more paths to be examined (processed), then processing is complete. Otherwise, control transfers from the test step 122 to a step 124 wherein the next path is determined using the depth-first acyclic search of the directed graph. Following the step 124 is a step 126 where a certificate pointer, CP, is set to point to the end of the path being examined (processed).

Following the step 126 is a test step 128 which determines if CP points to the trusted root, thus indicating that the entire path has been traversed. If so, then control transfers from the test step 128 back to the step 122, discussed above, to begin the next iteration. Otherwise, control transfers from the test step 128 to a step 132 where the path from CP to the trusted root is recorded in the table (discussed elsewhere herein) that stores certificates and trusted paths thereto. In one embodiment, at a portion of the table indexed by the certificate pointed to by CP, the path from CP to the trusted root is recorded at the step 132. Following the step 132 is a step 134 where CP is set to point to the previous certificate in the path. Thus, CP initially points to the end of the path and then subsequently points to previous certificates in the path working backwards toward the trusted root. Following the step 134, control transfers back to the test step 128, discussed above.

Figures 7A, 7B, 7C:
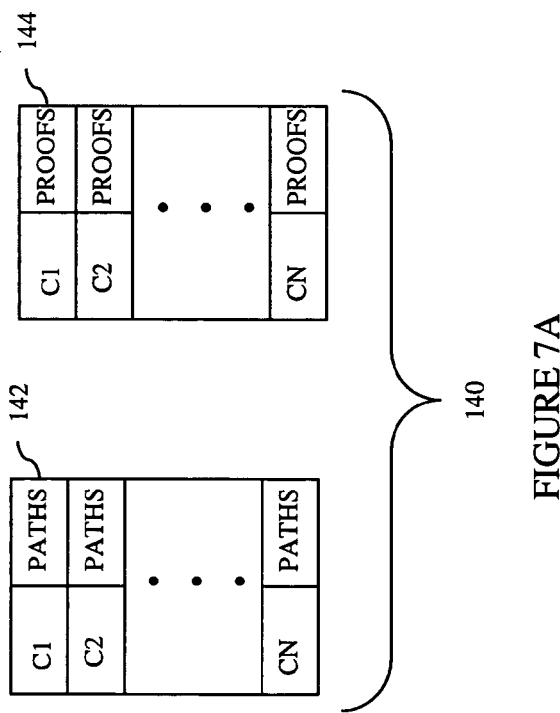
FIGS. 7A, 7B, and 7C illustrate tables containing trust paths and/or proofs according to an embodiment of the system described herein.

Referring to FIG. 7A, a table 140 includes a first portion 142 indexed by certificates in the system and having, as elements, trusted paths to each of the certificates. The table 140 may also include a second portion 144 that is also indexed by certificates in the system. The second portion has elements that describe proofs (e.g., OCSP responses, CRL's, etc.) indicating the revocation status for each of the corresponding certificates. In an embodiment described herein, the proofs provided in the second portion 144 correspond to the index certificate so that, for example, the table entry indexed by C2 corresponds to a proof for C2. In another embodiment, the proofs provided in the second portion 144 correspond to all of the certificates in all of the paths for a particular entry in the first portion 142. Thus, for example, the proofs provided in the second portion 144 in connection with certificate C2 correspond to all of the certificates in the trust paths provided in the entry for C2 in the first portion 142.

In some embodiments, it may be possible to eliminate one of the portions 142, 144. Thus, for example, in embodiments with only the portion 142, the UDPDV server 30 provides pre-calculated trust paths, but not proofs. For such embodiments, users may either forgo proofs altogether, obtain proofs in real time, or some combination thereof (i.e., obtain proofs for some certificates in the paths but not others). For embodiments with only the portion 144, trust paths may be determined in real time and the pre-calculated proofs from the portion 144 may be provided by the UDPDV server 30.

Referring to FIG. 7B, another embodiment uses a single table 140' indexed according to certificates, where both the trust paths and the proofs are provided as elements of the table 140'.

Referring to FIG. 7C, yet another embodiment illustrates another configuration for the table 140". The table 140" may be indexed according to a particular trusted root certificate TR1, TR2, ... TRN and other certificates C1, C2, ... CN. The elements at an entry of the table 140" contain trust paths and (optionally) proofs "P/P" so that, for example, an entry for trusted root TRx and certificate Cy contains one or more trust paths (if any exist) from Cy to TRx and, optionally, one or more proofs for just Cy (in one embodiment) or for all of the certificates in the trust path(s) (in another embodiment).

Figure 8:
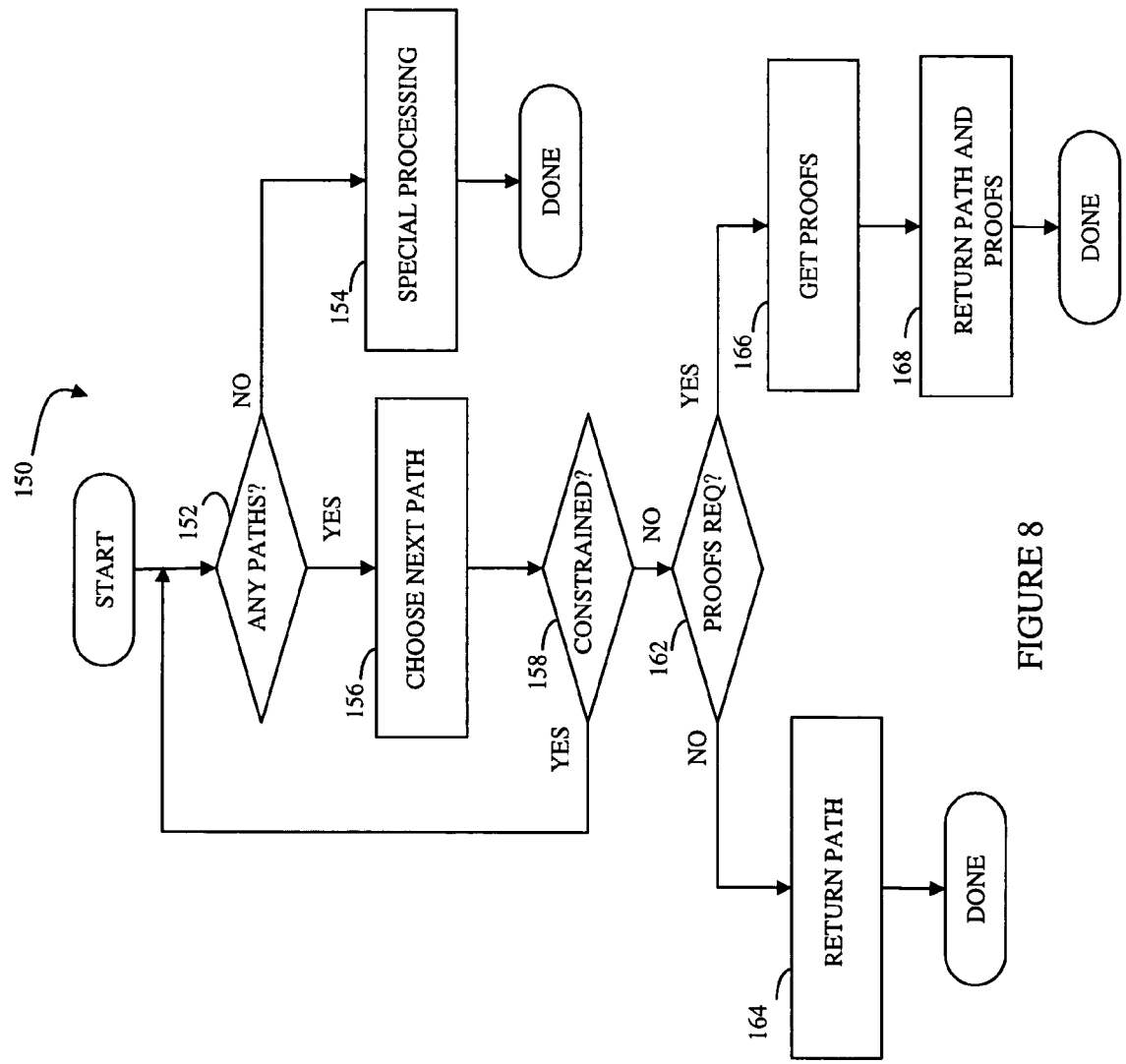
FIG. 8 is a flow chart illustrating returning pre-calculated trust paths and/or proofs according to an embodiment of the system described herein.

Referring to FIG. 8, a flow chart 150 illustrate steps for processing in connection with the UDPDV server 30 servicing a request from a user for a trust path and, optionally, proofs for certificates thereof. As discussed elsewhere herein, the UDPDV server 30 may be presented with a particular target certificate for which the UDPDV server 30 provides a trust path and optionally proofs indicating the status out each certificate in the trust path. In one embodiment, the trust path is provided to a certificate for an authority that issued the target certificate and, optionally, to a certificate for an authority that issued revocation information for the target certificate (if different from the issuing authority). In another embodiment, the UDPDV server 30 provides a trust path and optional revocation information for the target certificate itself.

Processing begins at a first step 152 where it is determined if there are any trust paths available at all for the target certificate or the issuer thereof. If not, then control transfers from the step 152 to a step 154 where special processing is performed. The special processing performed at the step 154 may include posting an error message and/or indicating to a user in some other way that no trust path has been found for the target certificate. Following the step 154, processing is complete.

If it is determined at the test step 152 that there are trust paths available, then control transfers from the test step 152 to a step 156 where the next trust path is chosen for processing. In an embodiment herein, the system may iterate through each of the trust paths (provided by the table 140, the table 140', or the table 140") to find an appropriate trust path between the target certificate (or issuer thereof) and one or more of the trusted root certificates. The next trust path chosen at the step 156 may be chosen using any of a number of possible criteria, such as shortest path, path containing particular certificates, etc.

Following step 156 is a test step 158 which determines if there are constraints on the particular trust path (certificates of the trust path) chosen at the step 156. As discussed elsewhere herein, there may be one or more constraints that prevent use of a particular trust path such as, for example, one or more certificates not being acceptable for certain purposes. If it is determined at the test step 158 that there are constraints that make the trust path being examined unacceptable, then control transfers from the test step 158 back to the step 152, discussed above. Otherwise, control transfers from the test step 158 to a step 162 where it is determined if proofs for the certificates in the trust path have been requested. If not, then control transfers from the step 162 to a step 164 where the trust path between the target certificate (or issuer thereof) and the trusted root certificate is returned to the user. Following step 164, processing is complete.

If it is determined at the test step 162 that proofs have been requested, then control transfers from the test step 162 to a step 166 where the proofs (from the table 140, the table 140', or the table 140") are obtained. In other embodiments, the proofs may be obtained in real time. Following the step 166 is a step 168 where the trust path and the proofs are returned. Following step 168, processing is complete.

As discussed elsewhere herein, in some instances, a user may desire to use the trusted distributed delegated path discovery and validation server 40 that returns a signed (or otherwise authenticated) message indicating whether or not a particular certificate is valid. The server 40 may sign a message indicating that a particular certificate is acceptable or not. The user may rely on the signed response from the server 40 without necessarily knowing or examining the path and/or the validation information first hand.

Figure 9:
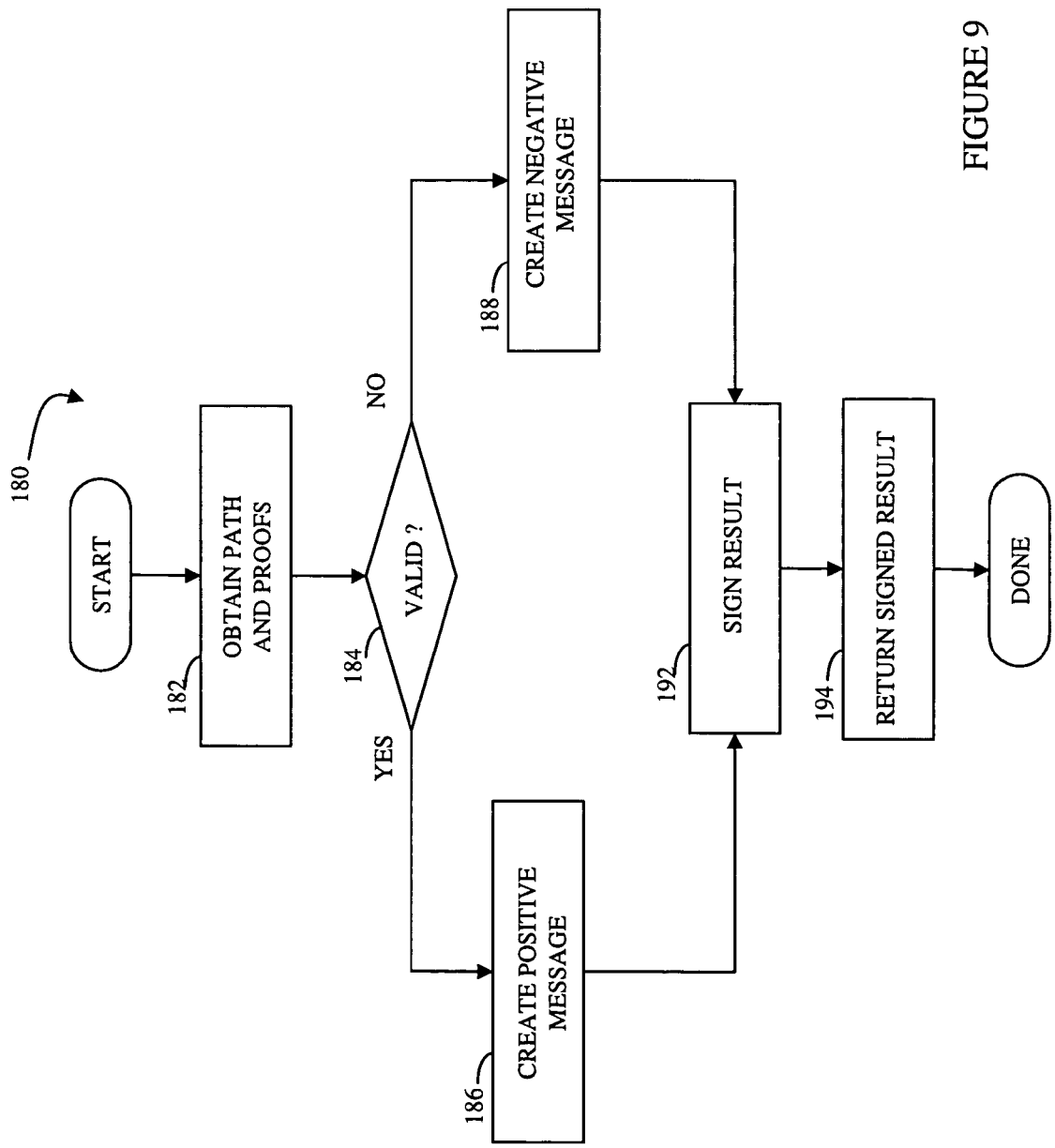
FIG. 9 is a flow chart illustrating processing performed by a trusted delegated path/validation server according to an embodiment of the system described herein.

Referring to FIG. 9, a flow chart 180 illustrates steps performed by the server 40 in connection with constructing and returning a signed message indicating whether or not a particular target certificate is valid. Processing begins at a first step 182 where the trusted path and proofs are obtained in accordance with the description elsewhere herein. Following the step 182 is a test step 184 wherein the trust path and the proofs are examined to determine if the target certificate is valid. The determination at the step 184 may be made using the trust path and proofs obtained at the step 182. If it is determined at the test step 184 that the target certificate is valid, then control transfers from the test step 184 to a step 186 where a positive message, indicating that the target certificate is valid, is created. Otherwise, if it is determined at the test step 184 that the target certificate is not valid, then control transfers from the test step 184 to a step 188 where a negative message is created.

Following either the step 186 or the step 188 is a step 192 where the message is digitally signed by the server 40. Following the step 192 is a step 184 where the signed result is returned to the user. Following step 194, processing is complete.

The system described herein may be implemented using any appropriate combination of hardware and/or software, including software provided in a storage medium (e.g., disk, tape, CD ROM, removable memory, etc.). The software may run on specialized hardware, on a general purpose computer, or an appropriate combination thereof.

While the invention has been disclosed in connection with various embodiments, modifications thereon will be readily apparent to those skilled in the art. Accordingly, the spirit and scope of the invention is set forth in the following claims.

What is claimed is:

1. A method of providing path validation information for a system, comprising:

determining, using at least one processor, paths between each of a plurality of certificates of the system and at least one trust root;

storing, in a non-transitory computer readable medium, validation information prior to a request for path validation information for a trust path from a target certificate to the at least one trust root, the trust path including a chain of certificates from the target certificate to the at least one trust root, wherein the validation information identifies a particular trust path from a particular one of the plurality of certificates to the at least one trust root, wherein the validation information for each particular trust path includes a proof for each of the plurality of certificates along the particular trust path indicating that each of the plurality of certificates has not been revoked, and wherein the proofs for the plurality of certificates are stored for each of the plurality of certificates of the particular trust path, are digitally signed, and are pre-generated prior to receiving the request for path validation information;

in response to the request for path validation information, determining, using at least one processor, the trust path from the target certificate to the at least one trust root that satisfies the request, fetching the validation information for the trust path, and providing to a relying party the validation information for the trust path in response to the request without performing real-time certificate status validation of the trust path; and applying name or policy constraints to the validation information and only providing validation information that is consistent with the constraints.

2. The method, according to claim 1, wherein determining paths includes constructing a directed graph of trusted roots and the plurality of certificates and performing a depth-first acyclic search of the graph.

3. The method, according to claim 1, wherein validation information for all of the trusted paths is stored in a table and wherein the table is indexed using the trusted roots.

4. The method, according to claim 1, wherein validation information for all of the trusted paths is stored in a table and wherein the table is indexed using the certificates.

5. The method, according to claim 1, further comprising: receiving and storing the proofs for the plurality of certificates at regular intervals prior to receiving the request for path validation information.

6. The method, according to claim 5, further comprising: digitally signing the proofs.

7. The method, according to claim 1, wherein the plurality of certificates includes trusted roots, authorities that issue end user certificates, and authorities that vouch for other authorities.

8. The method, according to claim 7, wherein the plurality of certificates further includes end user certificates.

9. A computer program product, stored on a non-transitory computer-readable storage medium, that provides path validation information for a system, comprising:
 a storage medium that contains executable code for the computer program product; executable code that determines paths between each of a plurality of certificates of the system and at least one trust root;
 executable code that stores validation information prior to a request for path validation information for a trust path from a target certificate to the at least one trust root, the trust path including a chain of certificates from the target certificate to the at least one trust root, wherein the validation information identifies a particular trust path from a particular one of the plurality of certificates to the at least one trust root, wherein the validation information for each particular trust path includes a proof for each of the plurality of certificates along the particular trust path indicating that each of the plurality of certificates has not been revoked, and wherein the proofs for the plurality of certificates are stored for each of the plurality of certificates of the particular trust path, are digitally signed, and are pre-generated prior to receiving the request for path validation information;
 executable code that, in response to the request for path validation information, determines the trust path from the target certificate to the at least one trust root that satisfies the request, fetches the validation information for the trust path, and provides to a relying party the validation information for the trust path in response to the request without performing real-time certificate status validation of the trust path; and
 executable code that applies name or policy constraints to the validation information and that only provides validation information that is consistent with the constraints.

10. The computer program product, according to claim 9, further comprising:
 executable code that digitally signs the validation information.

11. The computer program product, according to claim 9, wherein executable code that determines paths constructs a directed graph of trusted roots and the plurality of certificates and performs a depth-first acyclic search of the graph.

12. The computer program product, according to claim 9, wherein validation information for all of the trusted paths is stored in a table and wherein the table is indexed using the trusted roots.

13. The computer program product, according to claim 9, wherein validation information for all of the trusted paths is stored in a table and wherein the table is indexed using the certificates.

14. The computer program product, according to claim 9, further comprising:
 executable code that receives and stores the proofs for the plurality of certificates at regular intervals prior to receiving the request for path validation information.

15. The computer program product, according to claim 9, wherein the subset of certificates includes trusted roots, authorities that issue end user certificates, and authorities that vouch for other authorities.

16. The computer program product, according to claim 15, wherein the plurality of certificates further includes end user certificates.

17. A server, comprising:
 a processor;
 internal storage coupled to the processor;
 executable code, provided on the internal storage, that determines paths between each of a plurality of certificates of the system and at least one trust root;
 executable code, provided on the internal storage, that stores validation information prior to a request for path validation information for a trust path from a target certificate to the at least one trust root, the trust path including a chain of certificates from the target certificate to the at least one trust root, wherein the validation information identifies a particular trust path from a particular one of the plurality of certificates to the at least one trust root, wherein the validation information for each particular trust path includes a proof for each of the plurality of certificates along the particular trust path indicating that each of the plurality of certificates has not been revoked, and wherein the proofs for the plurality of certificates are stored for each of the plurality of certificates of the particular trust path, are digitally signed, and are pre-generated prior to receiving the request for path validation information; and
 executable code, provided on the internal storage, that, in response to the request for path validation information, determines the trust path from the target certificate to the at least one trust root that satisfies the request, fetches the validation information for the trust path, and provides to a relying party the validation information for the trust path in response to the request without performing real-time certificate status validation of the trust path; and
 executable code, provided on the internal storage, that applies name or policy constraints to the validation information and that only provides validation information that is consistent with the constraints.

18. The server, according to claim 17, further comprising:
 executable code, provided on the internal storage, that digitally signs the validation information.

19. The server, according to claim 17, wherein executable code that determines paths constructs a directed graph of trusted roots and the plurality of certificates and performs a depth-first acyclic search of the graph.

20. The server, according to claim 17, wherein validation information for all of the trusted paths is stored in a table and wherein the table is indexed using the trusted roots.

21. The server, according to claim 17, wherein validation information for all of the trusted paths is stored in a table and wherein the table is indexed using the certificates.

22. The server, according to claim 17, further comprising:
 executable code, provided on the internal storage, that receives and stores the proofs for the plurality of certificates at regular intervals prior to receiving the request for path validation information.

23. The server, according to claim 17, wherein the subset of certificates includes trusted roots, authorities that issue end user certificates, and authorities that vouch for other authorities.

24. The server, according to claim 23, wherein the plurality of certificates further includes end user certificates.

\* \* \* \* \*